(12) United States Patent
Rilum et al.

(10) Patent No.: US 7,016,295 B2
(45) Date of Patent: *Mar. 21, 2006

(54) HYBRID DISCS DISPLAYING CERTAIN DIMENSIONAL VALUES

(75) Inventors: John H. Rilum, Tustin, CA (US); Carlyle J. Eberly, Huntington Beach, CA (US)

(73) Assignee: Optical Disc Corporation, Santa Fe Springs, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/391,691

(22) Filed: Mar. 18, 2003

(65) Prior Publication Data

US 2003/0193875 A1 Oct. 16, 2003

Related U.S. Application Data

(63) Continuation-in-part of application No. 10/255,027, filed on Sep. 25, 2002, which is a continuation-in-part of application No. 09/558,071, filed on Apr. 26, 2000, now Pat. No. 6,570,840.

(51) Int. Cl.
*G11B 7/24* (2006.01)
(52) U.S. Cl. .................. 369/275.4; 369/275.3
(58) Field of Classification Search ............ 369/275.4, 369/275.3
See application file for complete search history.

(56) References Cited

U.S. PATENT DOCUMENTS

| | | | |
|---|---|---|---|
| 5,204,852 A | | 4/1993 | Nakagawa et al. |
| 5,274,623 A | * | 12/1993 | Usami et al. ............ 369/275.1 |
| 5,316,814 A | | 5/1994 | Sawada et al. |
| 5,696,758 A | | 12/1997 | Yanagimachi et al. |
| 5,822,286 A | * | 10/1998 | Nakayama et al. ...... 369/44.26 |
| 6,212,158 B1 | | 4/2001 | Ha et al. |
| 6,285,638 B1 | | 9/2001 | Konishi et al. |
| 6,512,735 B1 | * | 1/2003 | Takeda et al. .......... 369/275.4 |
| 6,580,678 B1 | * | 6/2003 | Kondo et al. ........... 369/275.2 |
| 2001/0005357 A1 | | 6/2001 | Ha et al. |
| 2003/0007447 A1 | | 1/2003 | Yeh et al. |

FOREIGN PATENT DOCUMENTS

| | | | |
|---|---|---|---|
| EP | 001063642 A2 | * | 12/2000 |
| JP | 3081695 | | 6/1993 |
| JP | 2002-109788 | * | 4/2002 |

* cited by examiner

*Primary Examiner*—A M Psitos
(74) *Attorney, Agent, or Firm*—Stephen J. Koundakjian; Charles W. Fallow

(57) ABSTRACT

A hybrid disc whose ROM grooves are less than 170 nanometers deep, and whose pre-recorded ROM data pits are more than 350 nanometers or less than 250 nanometers deep, as measured from the effective land level. The ROM pits may be pre-recorded in ROM grooves that are shallower than the ROM pits, where the ROM pits are narrower, of equivalent width or up to approximately 10% wider than the ROM grooves, respectively measured at half-depth, although the transverse extent of the ROM pits will not typically exceed that of the ROM grooves. The ROM lands intervene between consecutive ROM pits, whether or not a ROM groove is provided. In the preferred embodiment, one beam of a dual beam apparatus records the ROM pits, while the other beam records the R-band pre-grooves, and also records the ROM groove, if present. In most embodiments a thermal mastering process provides smooth feature surfaces to facilitate replication of the hybrid disc masters. The berms normally forming at the radial extremities of the pits and grooves in the masters, by thermal expulsion processes, may be reduced or eliminated by methods taught.

4 Claims, 17 Drawing Sheets

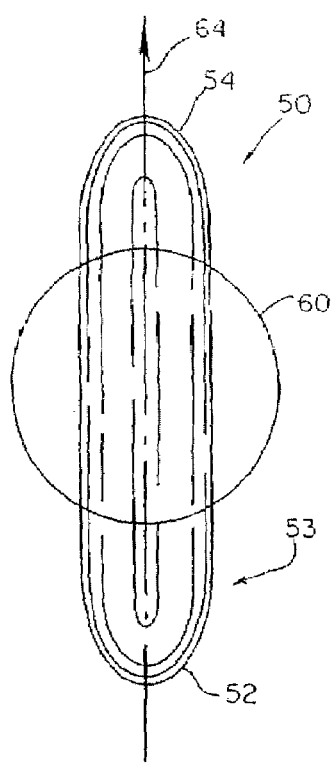
FIG. 3
FIG. 4
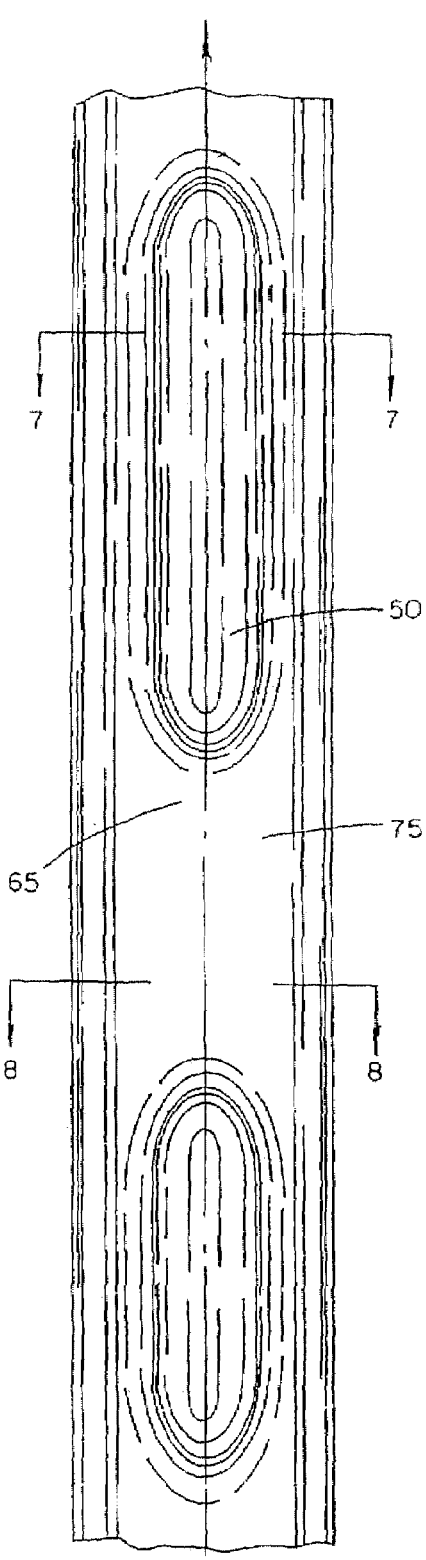
FIG. 6

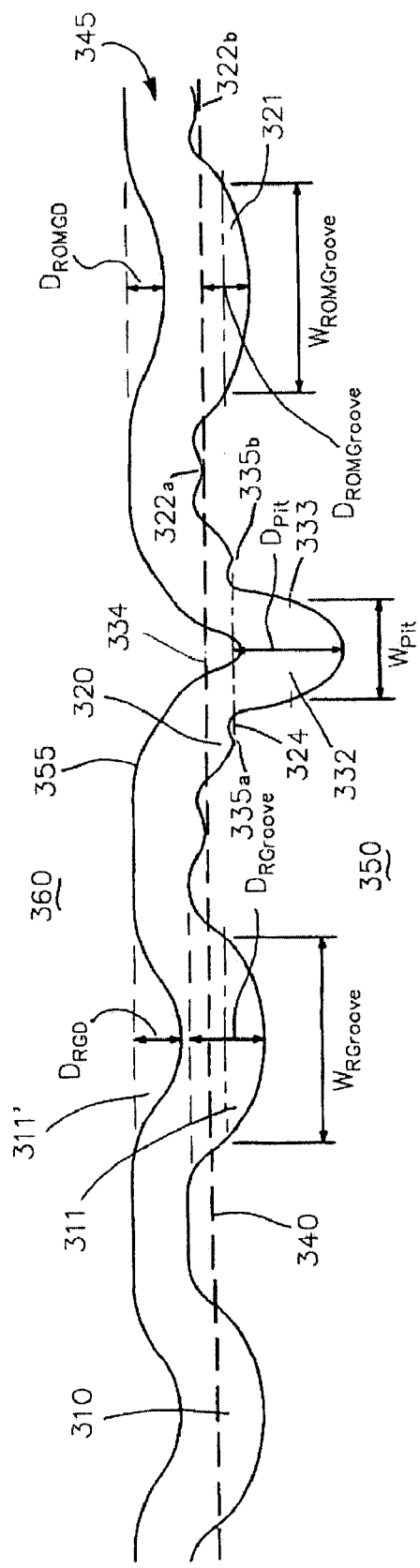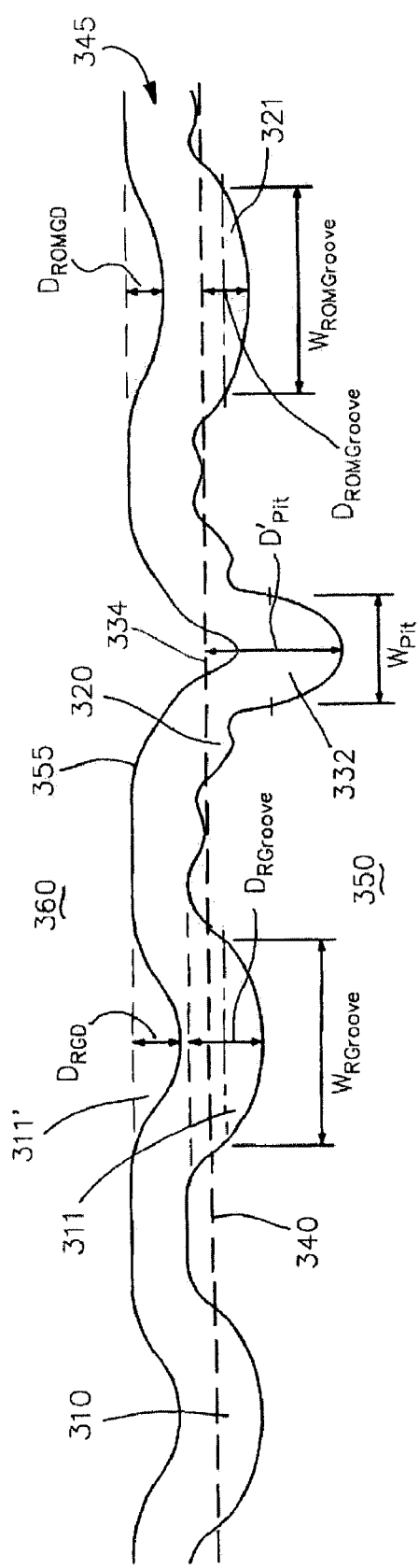
FIG. 23a
FIG. 23b

HYBRID DISCS DISPLAYING CERTAIN DIMENSIONAL VALUES

CROSS REFERENCE TO RELATED APPLICATION

This is a continuation-in-part of U.S. patent application Ser. No. 10/255,027, filed Sep. 25, 2002, which is, in turn, a continuation-in-part of U.S. patent application Ser. No. 09/558,071, filed Apr. 26, 2000.

BACKGROUND OF THE INVENTION

1. Field of the Invention

This invention relates to improved hybrid optical recording discs, together with apparatus and methods for manufacturing them.

2. Description of Prior Art

CD-Rs (recordable compact discs) and DVD-Rs (recordable digital versatile discs) are well known in the art. A less familiar new format, DVD+R has recently been introduced, but practitioners of ordinary skill in the art are, or will soon be, familiar with this format as well. In any of these formats, data, represented in an extensive sequence of typically elongated, three-dimensional marks in a spiral track winding circularly around the disc, may be optically recorded by rotating the disc at constant linear velocity ("CLV") and directing a selectively-controlled laser beam at a pre-grooved track in a recording layer provided near one of its essentially planar surfaces. For simplicity, the ensuing discussion will concentrate on the CD-R format, although occasional reference will be made to the DVD-R format. The differences are well understood by those of ordinary skill in the art, as well as the manner in which this discussion should properly be understood for application to any hybrid disc format based on representation of data by microscopic three-dimensional marks.

Also, for the sake of clarity, certain dimensional conventions will be employed: "Radial" or "transverse" will mean "radially, from or toward the center of the disc." "Longitudinal" will mean "along the track," e.g., from the leading edge to the trailing edge of a data mark. The longitudinal direction, at the microscopic level, will thus be normal to the radial direction, both axes being parallel to the disc surface. Accordingly, a measurement transverse to the longitudinal direction, in the plane of the disc, will be in the radial direction. "Vertical" will mean "normal to the disc surface, as well as normal to the radial and longitudinal directions."

The recording layer comprises a dye whose color is complementary to that of the write laser, covered by a thin, reflective metallic layer (in turn, typically covered by a final, protective layer) to reflect the laser beam energy back into the recording layer. The beam is normally directed through the disc substrate ("second surface recording"), which is a suitable transparent material, typically polycarbonate, to create the data marks in the recording layer near the opposite surface.

In accordance with convention, the input data are subjected to EFM (eight-bit-to-fourteen-bit) modulation, in the case of CD-Rs. Here, sequential binary input data (to which the information to be recorded and later retrieved has been converted) are converted into a sequence of spaced rectangular pulses, each of whose durations is nT, where T is the nominal EFM clock period, approximately 231 nanoseconds (billionths of a second), and n is an integer from 3 to 11. In the case of DVD-Rs, "EFM Plus" modulation is employed. This differs from EFM modulation principally in that: (1) eight-to-sixteen bit modulation is employed; (2) the integer n may be 3 to 11, or 14; and (3) T≈38 nanoseconds. Every EFM or EFM Plus encoded data stream always contains pulses and intervening temporal spacing comprising all of the possible nT durations. As is well known in the art, the interval between each transition (pit-to-land or land-to-pit) and the next successive transition separately represents a quantum of data. Thus each data pulse and each intervening land is of nT duration, where, in each data stream, all permitted values of n must be represented in both the pulses and the intervening lands. Other modulation schemes have been used or proposed, and further modulation methods will doubtless be employed in the future, as the data density on optical recording discs inevitably increases. However, it should not be difficult to generalize from this discussion to encompass any such ordinary engineering modifications.

In the case of CD-Rs or DVD-Rs, which are the principal subject of this discussion, each data track recorded onto a spiral pre-groove in the recording layer comprises a succession of a great number of microscopic, three-dimensional marks interspersed by unmarked, or differently marked, lands However, the present invention applies also to mastering hybrid re-writable media, such as CD-RW hybrid discs and magneto-optic (MO) discs, where the data marks (with the exception of ROM marks in CD-RW masters and replicatable marks in MO discs) would be essentially two-dimensional. CD-RW hybrid discs and MO discs will be further mentioned briefly below.

The track pitch (i.e., the radial distance between the longitudinal axes of adjacent, essentially circular track portions) is microscopic, as is the length and width of each of the marks. Superimposed on the otherwise smoothly spiral tracks is "ATIP" (absolute time in pre-groove) timing data, which, in the CD case, is contained in a radially sinusoidal carrier modulation at 22.05 kHz (nominal), having an amplitude, in respect to the longitudinal axis of the "un-wobbled" spiral pre-groove, of ±30 nanometers (nominal).

Despite its ATIP wobble and its necessarily spiral configuration, a data track in the recording layer may be thought of as a large number of closely spaced, essentially circular pathways, each containing a great many three-dimensional data marks and intervening lands in succession. In some applications, a particular data track or track portion might not be completely circular, in the sense that it might occupy only an arc of a circle on the disc. However, in this discussion arcuate and circular data tracks or portions of tracks will be referred to interchangeably as being circular data tracks. Since the circumference of each of these essentially circular pathways is very great, in comparison to the dimensions of the marks and lands, a small succession of marks and intervening lands will appear to be a linear (i.e., straight line) sequence at the microscopic level. Accordingly, at the microscopic level, radially adjacent data tracks on the disc may be viewed as essentially parallel lines of data, each containing a longitudinal succession of linear marks and lands, although at the macroscopic level they are essentially concentric circular paths.

The data marks typically appear as elongated, slightly bulging three-dimensional marks within the pre-groove, confined between the reflective layer and the substrate. To some degree, at least, each mark includes a distortion of both the substrate and the reflective layer. The character of the material in the recorded mark differs from the unrecorded areas of the recording layer, in that the index of refraction of the material in the mark is changed by imposition of the modulated laser beam, and additional physical and chemical changes occur as well. The intensity of the laser beam is modulated in accordance with the encoded data to be recorded, and each resulting mark and each intervening land represent a portion of the data. In CD-R recording, the run length of each data mark and land corresponds to a pulse of 3T to 11T duration. Since CLV is employed, all marks and lands corresponding to the same nT value are ideally of the same length. Once recorded, the data may later be selectively retrieved (i.e., decoded and processed) by means of a CD player. Ideally, a CD player will not be able to distinguish between data marks and lands read from a CD-R or from an ordinary CD-ROM (compact disc read only memory, e.g., software CDs), and data will thus be retrievable from each format in the same manner.

Various "write strategies" i.e., data signal modulating schemes (e.g., a leading end intensity boost of prescribed amplitude), may modify the encoded data signal in connection with creating the final laser beam intensity controlling (i.e., modulation) signal. These are intended ultimately to create data marks and lands whose leading and trailing ends are three-dimensionally symmetric, and of the proper lengths, to ensure accurate "HF" (high frequency, i.e., data) retrieval by minimizing systematic mark length errors. The latter depends on accurately measuring the length of each mark, from its leading edge land-mark transition to its trailing edge mark-land transition, and measuring the length of each land from its leading edge mark-land transition to its trailing edge land-mark transition, and reconverting these lengths to their corresponding nT values. If the marks and lands are three-dimensionally symmetric, and with proper lengths, HF retrieval is facilitated by enabling selection of a particular reflectivity, which will then correspond to either transition point.

Since CD-Rs and CD-ROMs are intended to be read interchangeably in a CD player, this write-strategy adjustment of the encoded data signal is important to ensure that the player is unable to detect any difference between a CD-R or CD-ROM, although CD-Rs must conform to the Philips-Sony "Orange Book" specification, while a CD-ROM must conform to the "Red Book" specification. These Philips-Sony specifications are well known to those of ordinary skill.

As stated above, the optical disc is normally recorded and later read by rotating it rapidly on a motor-driven spindle, at CLV. (It might be noted that some players utilize constant angular velocity playback, although this discussion will assume CLV recording and playback.) Tracking—maintenance of the radial position of the write beam and/or the read beam precisely in the center of the data track—is accomplished through a servo apparatus that compares at least a single pair of continuous readings. In CD-R players, single beam ("push-pull": "PP") tracking is normally employed. Here, the reflected beam is optically split into a data retrieval beam and a tracking beam. In CD and DVD-R applications, the reflected tracking beam component of essentially circular cross-section is divided into two equal semi-circles, the dividing line between them being parallel to the longitudinal track axis, i.e., each reading in the pair is taken on opposite sides of the longitudinal axis of the track. The tracking sensor continuously compares the intensity of the two halves of that image, and a servomechanism adjusts the radial position of the beam to cause the sensed light in both halves to be equal. The latter condition indicates that the readings are being taken from the center of the track axis, i.e., that proper tracking is occurring.

Generally, the same sensor is employed for tracking and for data retrieval. In single-beam CD tracking, one of the two sensed components is subtracted from the other, and a zero difference (i.e., equal input from both sides) indicates proper tracking. Data retrieval is accomplished by adding the two halves. In pre-recorded DVD applications, differential phase tracking is employed, in which the reflected light is divided into four quadrants and the phasing of each is compared to determine tracking condition.

Most CD-ROM players employ triple-beam HF retrieval and tracking, as shown in FIG. 4, discussed below (although the Red Book only prescribes standards for single-beam, PP tracking). In triple-beam tracking, the read beam is split into three beams, the read beam itself, a first tracking beam directed one or more mark lengths ahead of it and offset ¼ of the track pitch (approximately ¾ mark width) to one side, and the second tracking beam directed one or more mark lengths behind the read beam and offset ¼ of the track pitch to the other side. Each of the two tracking beam reflections is individually sensed continuously for tracking, in the manner described above in respect to PP tracking.

Beam focusing is likewise accomplished through a suitable feedback mechanism. Beam focusing is commonly employed and well known in the art, and therefore need not be further described except as may be necessary to describe particular applications.

Part II of the Orange Book contains the specifications for hybrid discs, such as described in some detail in U.S. Pat. No. 5,204,852, Nakagawa et al. In simplest terms, a hybrid disc is an optical recording disc that, in alternating annular track bands, contains pre-recorded data (the "ROM" bands), and bands of pre-grooves covered with an optical recording layer (the "R bands") on which data may be selectively recorded in the manner described above in respect to CD-Rs. The ROM data may, for example, comprise encryption information to prevent copying of the selectively recorded data, or it might comprise instructions to the CD-ROM player as to how the recorded data should be decoded and/or processed. Of course, there are many other types of data that could be pre-recorded into the ROM region. According to the Orange Book, the hybrid disc must have five annular bands. Radially from the disc center—as is well known, optical discs are normally recorded and read from the center toward the outer circumference—and with reference to the hybrid disc 300 shown schematically in FIG. 19 (with bands of arbitrary radial width) the first is the R1 band 301, which allows the CD-R recorder to optimize its nominal write laser power. Next is the ROM1 band 302, the "PMA" (program management area), which typically comprises only up to a few disc turns. This band contains information on the number of tracks in the disc, and its purpose is to close the disc after recording. Next, in succession, are selectively wide R2, ROM2 and R3 regions, 303, 304, 305, respectively, the last of which may extend nearly to the outer circumference of the disc. Manufacture of a hybrid disc is a multi-step process. First, a hybrid disc master must be created with the requisite sequential ROM and R bands. Here, the ROM data are recorded in an optical recording layer on a surface of a blank master, whose substrate can be any convenient material, such as polycarbonate or glass, for typical first surface ("from the top") recording, as described below. The substrate must, of course, be transparent for disc masters created by second surface recording. The ROM data, as mentioned above, can be encryption data or anything else the manufacturer wishes to record in the ROM region(s). The R bands of the disc master will display the spiral tracking pre-groove. The entire disc master will be provided with ATIP timing information in a conventional manner.

The hybrid disc master is typically created by one of two methods, respectively the photoresist ("PR") process or the dye-polymer process. Other disc mastering processes may exist and doubtless others will arise in the future, but this discussion will concentrate on these two methods, of which the PR process is presently the more commonly employed.

The Photoresist ("PR") recording method is essentially a photographic engraving process. The recording surface of the hybrid disc master comprises a thin, photosensitive polymer resin layer of substantially uniform composition, which has exposure characteristics virtually identical to those of photographic film emulsions. Accordingly, PR is a purely photochemical (i.e., optical) method of optical data recording. In other words, in PR, it is not the quantity of heat instilled in a selected small portion of the disc surface that exposes the photoresist; it is merely the quantity of incident light that determines if sufficient exposure occurs to enable formation of the desired three-dimensional features.

A threshold quantity of light is required to effect initiation of exposure at the photoresist surface. The extent and depth to which the photoresist below the immediate surface is exposed depends on the intensity and duration of the impinging write laser light and the optical characteristics of the photoresist material, itself. Because of light absorption and scattering within the photoresist medium, and the development process, the width of the exposure within the medium typically decreases as its depth increases. However, as a general principle it is accurate to say that increasing the incident intensity will tend to increase the depth of exposure within the photoresist medium, assuming the same duration (rotation velocity). The radial width of the exposure (particularly at the surface) is determined by the write beam width, it being understood that the beam cross-section may be thought of as an Airy disc, with a Gaussian distribution of intensity, radially. Since PR is a purely optical process, exposure begins and ends instantly, as the write beam is, respectively, activated and deactivated for each write pulse, as the disc rotates beneath the beam.

The data pulses ("on" times) ultimately generate pits in the hybrid disc master surface, while the "off" times result in the intervening lands. Because the entire data stream is encoded, both the marks and lands contain independent data. In PR recording of a ROM area, an EFM (or EFM Plus) coded waveform results in modulation of the intensity of a focused spot of light (normally from a diode or gas laser) impinging on the recording surface of the revolving disc master. By properly synchronizing the CLV rotational speed of the disc with the radial position of the beam relative to the disc center, this produces a track of narrow, typically elongated latent images produced when the light spot is "on," interspersed with unexposed lands, in the ROM bands. A continuous latent image, spiraling around the disc, is created in the R bands. The width of these images will be somewhat less than ~1 micron, in the case of CD mastering, and approximately half that with DVD mastering, since DVD dimensions are approximately half those of CD.

When the entire ROM area and the R band spiral track (or collection of concentric tracks) are "exposed" onto its surface, the hybrid disc master is "developed," as in the case of ordinary photographic film. In this step, an etching solution is introduced to dissolve and remove the exposed regions of resist (or the unexposed regions, depending upon whether a positive or negative resist is used), which creates a succession of a very large number of narrow, three-dimensional, typically elongated microscopic pits and intervening lands in the ROM bands and spiral pre-grooves in the R bands of the hybrid disc master. In the ROM bands, the width (i.e., transverse extent) of these ROM features, at the disc surface, will be essentially identical to the effective width of the write beam, as will the disc surface width of the pre-grooves in the R bands. Below the surface, the width of each pit and pre-groove will decrease. Once again, the interval between each successive pair of transitions (from a pit-land transition to the next land-pit transition, or vice versa) individually represents a quantum of data corresponding to a particular data packet (i.e., pulse) in the original EFM (or EFM Plus) signal.

The thickness of the photosensitive data layer (deposited on the much thicker glass or polycarbonate substrate) is usually selected to be identical to the desired ROM pit depth. Thus, when the photoresist is fully exposed (through its entire thickness) by a write beam of sufficient intensity, flat-bottomed pits will be produced. Their depth will be the same as the thickness of the photosensitive layer. They will display, in transverse section, an essentially trapezoidal shape, whose sidewall-to-base (and, usually, surface-to sidewall) junctions will be rather sharply angular. Because the PR method is a photoengraving process, and the photoresist will not be of absolutely uniform consistency, the sidewalls will be somewhat rough.

Failure to fully expose the photoresist (resulting in residual photoresist at the bottom of the pit) by utilizing reduced write beam intensity will create pits or grooves having an essentially triangular section. As discussed below, earlier practitioners employing the PR method to create hybrid disc masters have often generated R band pre-grooves of that transverse configuration. Such shallow features, created by the PR method, have been found generally to produce "noisy" data output readings from replicated discs, because of inherent roughness in the etched photoresist layer and greater susceptibility to write laser noise. Indeed, the PR method of disc mastering, because it is an etching process, generally produces three-dimensional features with rough surfaces. These compromise detection accuracy, because the playback signal amplitude is affected by surface characteristics. This problem will be further discussed in respect to U.S. Pat. No. 5,696,758, Yanagimachi et al., and U.S. Pat. No. 6,212,158, Ha et al.

In any event, the thickness of the photoresist layer and the exposure level—and thus the resulting pit (or pre-groove) depth—are normally selected for optimal detection from replicas in a manner well known by those skilled in the art. As stated above, pit and pre-groove width are determined by the power and effective width of the recording beam. The latter is determined by the wavelength of the write laser utilized and the numerical aperture ("NA") of the focusing means, in a conventional manner. The transverse sectional shape of the pit, whether trapezoidal or triangular, may be controllable, to at least some degree, by the optical characteristics of the photoresist material, the etching process, the power of the write beam and the particular focusing configuration selected, as described in the patent literature. Finally, the length of each resulting ROM pit will be primarily determined by the duration of the corresponding EFM (or EFM Plus) data pulse, as will be the length of each intervening land.

Once again, regardless of the particular application, the PR method is essentially an etching process, and even if the photoresist is fully exposed, a certain amount of roughness inevitably occurs on the pit sidewall surfaces. While this has not proved to be a particularly significant problem in ordinary CD-ROM mastering applications, the PR method of disc mastering is unconducive to production of hybrid CD masters from which hybrid CDs can be rapidly manufactured with a low rejection rate. This is due to at least four inherent characteristics of the PR method: (1) it tends to generate features with sharp corners, in transverse section, causing molding problems that increase cycle time; (2) shallow features, created by partial exposure of the photoresist, are noisy when read; (3) it is a generally difficult process to control; (4) the inherent roughness of PR-generated data pits and grooves impedes accurate hybrid CD data retrieval. Furthermore, this problem of roughness in PR-generated disc masters can only become more troublesome as data densities increase beyond the present CD and DVD level of approximately 4.2 gigabytes per data layer, and data retrieval strategies necessarily become more sophisticated.

Dye-Polymer optical data recording is addressed in U.S. Pat. No. 5,297,129 (hereinafter, "the '129 patent") and U.S. patent application Ser. No. 09/558,071, the parent of the present application (hereinafter, the "Parent application"), each assigned to the assignee of the present application, and both fully incorporated herein by reference.

Unlike the PR method, dye-polymer recording is a thermal process, proceeding on the basis of physical principles quite different than those underlying PR. As discussed in the '129 patent and the Parent application, this thermal process requires a fairly sophisticated write strategy. This is because in the dye-polymer case, a small amount of time is required, after the beam is activated at the beginning of each pit formation, as the disc master rotates, to heat the dye-polymer to its thermal threshold. This causes a tapered leading edge of the resulting pit. On the other hand, cooling occurs almost instantly when the beam is shut off, resulting in relatively blunter trailing edges. Thus, unlike the purely optical PR case, where virtually unmodified EFM pulses may be utilized for laser beam intensity modulation, dye-polymer disc mastering requires careful modification of the EFM pulses to counteract these thermal effects. The '129 patent addresses this problem and teaches an effective dye-polymer mastering write strategy, while the Parent application non-exclusively identifies various equivalents.

Hybrid CD or DVD mastering by the dye-polymer process comprises selective expulsion of the photo-thermally active recording layer of the hybrid disc master, to yield a succession of pits and intervening lands, each representing data, in the ROM bands, and yielding pre-grooves in the R bands. This recording layer comprises a mixture of a polymer (e.g., nitrocellulose) and a dye whose color is complementary to that of the (typically, laser) write beam to promote maximum heat absorption. The proportion of dye in the dye-binder mixture should be sufficient to obviate the need for excessive write laser power, while low enough to minimize the effects (e.g., noisy readings from the final hybrid disc) that might result from dye residue on the surface of the hybrid disc master. The proportion of dye in the dye-polymer mixture is generally quite low, with a preferred range of approximately 3–5%. As more powerful, narrower write beams, e.g., ion or electron beam sources, are utilized, the selection of the dye color (if, indeed, any dye is even required in such applications) would proceed according to generally understood principles, based on the particular type of write beam selected.

Accurate data retrieval requires accurate tracking. So the recording parameters employed in dye-polymer hybrid disc mastering must provide sufficiently precise three-dimensional pit shapes, land configurations and pre-grove profile, to ensure that commercial CD and DVD players can accurately follow the data track(s) in the replicated and subsequently recorded hybrid discs, while they perform accurate HF data retrieval. Unfortunately, this is complicated by the fact that the criteria inherent in accurate HF detection and in accurate "PP" (push-pull) tracking, required by the Red Book specifications in all pre-recorded CD applications, are mutually exclusive. There exists a similarly fundamental tradeoff in PP and groove reflectivity, in the Orange Book CD-R, DVD-R and hybrid disc specifications.

The desired HF optimization is achieved with an effective pit depth (noting that each pit will normally posses a curved base, caused by the dye-polymer expulsion processes) equal to $\lambda/4$, where $\lambda$ here is the wavelength of the (typically, laser) read beam within the substrate material (since discs are normally read from the second surface). This will create a $\pi$ (180°) phase shift in the reflected light, effectively canceling out, by interference, the small proportion of incident light not already scattered away by diffraction. By contrast nearly 100% of incident light is reflected from the essentially flat land areas. It can easily be seen, then, that with $\lambda/4$ effective pit depth the change in reflected light detected at each pit/land transition will be very abrupt, thus facilitating accurate detection of pit and land length—i.e., accurate HF detection.

By contrast, PP detection generally measures the quantity of light diffracted from the pit at an angle in respect to the vertical direction. This is normalized with the known or observed reflectivity of the disc surface, to provide comparative values in the particular context. Thus, in CD applications, radial PP detection is merely an amplitude comparison of detected light on either side of the longitudinal track axis (whether within a pit, land area). When more reflected light is received on one side of the PP detector than the other, the PP servo moves the read beam in the opposite direction, radially, until detection in the two halves is equalized, indicating proper tracking. A $\lambda/8$ effective groove depth, producing a $\pi/2$ phase shift, optimizes PP detection, rather than the $\lambda/4$ effective groove depth and corresponding $\pi$ phase shift that optimize HF detection. As mentioned above, a similar $\lambda/8$-$\lambda/4$ dichotomy exists between PP and unrecorded groove reflectivity in CD-R and DVD-R applications, and other optical recording applications, such as hybrid CDs, present closely analogous dichotomies.

A recently granted European patent—EP 96908632.1, (hereinafter, "Schoofs")—deals, to some extent, with the problem of improving PP detection in an optical data disc (apparently, a dye-polymer recording), hopefully without unduly compromising HF detection. The proposed solution is to maintain the intensity of the write beam between write pulses at a level just above the thermal threshold of the moving medium. This creates a narrow, shallow groove in the land area connecting successive pits, which essentially increases PP tracking signal strength between pits with hopefully little negative effect on HF (i.e., pit/land transition) detection accuracy.

To a certain degree, the method taught there would superficially seem to satisfy the PP optimization criteria, in that the land groove can be made to be approximately $\lambda/8$ in effective depth (in the hybrid disc case, its effective phase depth would be approximately $\lambda/8$). However, because this is accomplished by reducing the write beam intensity to near the thermal threshold, the resulting land groove must necessarily be quite narrow. But this actually compromises PP detection, because another feature of the PP/HF dichotomy is that optimal PP detection is realized with a groove that is wider than one that would optimize HF detection. Furthermore, HF detection is not significantly addressed by Schoofs. Indeed, the logical extension of the Schoofs teachings would be to further increase beam intensity between pits to widen the groove for hopefully better tracking. But that would actually compromise PP detection by deepening the groove and would also compromise HF detection by causing pit/land transitions to be more difficult to detect, thus negatively counterbalancing any proposed PP improvements.

In the context of hybrid disc manufacture, very similar problems will also occur in following the Nakagawa, Yanagimachi and Ha teachings, to be discussed shortly.

Creating a disc master by whatever method (e.g., the PR method or a thermal method, such as the dye-polymer method), and in whichever format (CD-ROM, hybrid CD, etc.) is only the first step in the disc production process. It is the final disc that is of principal interest, not the disc master. The final disc, to which the manufacturing specifications are addressed, is not obtained until a number of intermediate steps have been taken in the manufacturing process.

Once recorded, the hybrid disc master is converted to a metal stamper by conventional galvanic processes, and polycarbonate daughter discs are molded from it. If sufficient skill and care are exercised, the stamper will be a virtually exact mirror image of the master, and the resulting "clear replica" hybrid discs will likewise be virtually exact copies of the master. They will display the recorded ROM data in the ROM bands, and will display the necessary CD-R pre-groove in the R bands. Failure to properly optimize the overall disc production line, by ongoing testing of final (processed) hybrid discs and corresponding adjustment of the mastering parameters, in a feedback loop process (see, below), may yield stampers that are reasonably good mirror images of the masters and clear replica hybrid discs whose features are closely similar to those of the master, and yet result in final hybrid discs whose ROM data marks and pre-grooves do not exactly display the cross-sectional shape of those in the master. The latter, as well as later-recorded hybrid discs, must conform to Orange Book specifications (and also to Red Book specifications, incorporated into the Orange Book, in respect to the ROM areas). There are no specifications for the hybrid disc masters or for the clear replica hybrid discs, themselves, since it is only the ultimate replicas that are of commercial interest.

Not only is it necessary to optimize the mastering process to enable production of final hybrid discs that meet manufacturing specifications, it is also necessary to maximize their Figure of Merit. As is well known in the art, the Figure of Merit is a weighted function that measures overall conformity to the applicable specifications, such as the amplitude of HF detection, the amplitude of PP detection, minimization of cross talk between radially adjacent portions of the data track, etc. The Figure of Merit is increased as the observed parametric values of the final hybrid discs within the relevant specification categories are brought closer to the center of the acceptable ranges of each of those categories, and maximized where only a lower limit applies. Thus, maximizing the Figure of Merit means that the system has been optimized to such an extent that the often-unpredictable variations normally encountered in the various manufacturing steps will probably not cause the final products to be out of spec. Maximizing the Figure of Merit, therefore, ensures a "forgiving" system and good product yields.

According to Red Book specifications, the CD track pitch ("TP") is between 1.5 and 1.7 microns, the nominal value being 1.6 microns. The length of an EFM-coded CD pit, measured at half-depth (where all widths and lengths are conventionally measured), is nominally 0.3 micron per T, where the pit length spatially represents an input data pulse run length of nT temporal duration. The width ("PW") of a CD pit (again, measured at half depth, as shown in FIG. 18) and the spot diameter of the write beam creating it are each approximately 0.5 micron, i.e., approximately TP/3. On the other hand, the read beam is approximately double that width, or about 1 micron wide. Since various laser wavelengths are utilized in CD recording, the numerical aperture of the objective lens focusing the beam must be selected to yield a beam spot of the same diameter regardless of the beam source, so that the pits will be the same width regardless of the apparatus used, to ensure that the resulting pits may be uniformly read. The spot diameter, d, is determined by the formula $d \approx 0.5\, \lambda/NA$, where $\lambda$ is the beam wavelength in vacuo, NA is the numerical aperture and d is the diameter of the resulting spot. In the case of CD playback, for example, $\lambda=0.780$ micron, and NA=0.45, so $d \approx 0.9$ micron.

Similar proportions apply in DVD applications, although the transverse dimensions pertaining to DVD recording and reading are approximately 50% of those of CD applications, reflecting the correspondingly shorter channel bit lengths of DVD marks. Presumably, future higher-density applications—utilizing higher frequency (i.e., shorter effective wavelength) write and read beams, smaller pits and narrower track pitches—will employ similar relative proportions.

Double-sided (or layered) discs can be generated by utilizing two molds—one for each side (or layer)—each made from a separate disc master, recorded in the manner discussed above.

By whatever method the master is recorded, the final steps in hybrid disc manufacture are spin coating, onto each clear replica hybrid disc, a thermally-active recording layer; overcoating that layer with a thin, metallic reflective layer; and, normally, applying a protective layer above the latter. The recording layer will, of course, tend to fill in portions of the ROM data pits (particularly, those of shorter run lengths, e.g., 3T to 5T, as discussed below) and intervening lands, as well as the R band pre-grooves. The depth of the resulting optical recording layer above the ROM pits and the R band pre-grooves (into which the CD-R data pits will later be recorded) depends on a host of factors, e.g., the viscosity of the layer before drying, the drying conditions, the spin velocity and the transverse shapes of the pits and pre-grooves. The final hybrid discs, as well as later-recorded hybrid discs, must, in their entireties conform to the Orange Book specifications, and their ROM areas must also conform to the Red Book specifications, insofar as they are incorporated into the Orange Book specifications.

Despite confident assertions made in the prior art, their teachings do not, individually or collectively, appear capable of providing a method, apparatus or structure that offers the range of selectively adjustable parameters, nor the general flexibility, necessary to maximize Figure of Merit and thus promote reliable production of hybrid discs that satisfy Red Book and Orange Book specifications in a high-speed manufacturing environment. These prior art deficiencies will now to be discussed. The Nakagawa hybrid disc patent (U.S. Pat. No. 5,204,852), mentioned above, is based on photoresist recording of ROM data pits and R band pre-grooves (Column 5: lines 3–20), and teaches exposure of the photoresist in the ROM area at a different level than in the R band area. Two basic embodiments are taught: one displaying a pre-groove with a triangular transverse section, the other displaying a rectangular transverse section. Both embodiments of the pre-groove are shallower than the ROM data pits, because the photoresist is not fully exposed while the pre-grooves are created.

As discussed above, this partial exposure of the photoresist would generate the triangular-section pre-groove of the first Nakagawa embodiment. However, it is not seen how Nakagawa proposes to generate the rectangular section pre-grooves. In fact, this would be very difficult, if not literally impossible, to accomplish by the means taught. While some light scattering may occur within the photoresist, the exposure cross-section would tend to narrow from the disc surface downward, most likely yielding the typically observed trapezoidal profile.

Possibly recognizing at least the difficulty of creating the second-embodiment shallow, rectangular-section pre-grooves, Nakagawa offers a third embodiment (Column 11, line 66 to column 12, line 36), in which a first beam exposes the photoresist to (hopefully) create the rectangular-section pre-groove, and a second beam then partially exposes the entire R band with the hope of reducing the effective depth of these pre-grooves. It will perhaps be appreciated that this double exposure of the photoresist would, at best, be a very difficult process to control. As with the second embodiment, no teaching is given as to how this might be accomplished.

Furthermore, even if Nakagawa, or one of ordinary skill practicing his teachings, could somehow create disc masters with ROM pits and R band pre-grooves of rectangular cross-section—which is highly unlikely—it would be nearly impossible to replicate such masters, simply because the molded clear replica hybrid discs would adhere strongly to the stampers, which would display millions of features having vertical sides, rather than the slanted sides of the trapezoidal cross-section features normally seen in PR-generated masters.

The depth of the thermally-active recording layer applied over the R band pre-grooves, in Nakagawa's clear replica hybrid discs, must be greater than over the pits already recorded in the ROM band(s). This is to ensure that the resulting pits selectively recorded in the R band(s) will have the same effective optical depth as those already existing in the ROM section, after the spin-coated recording layer that spreads across the entire disc has covered them. Accordingly, Nakagawa suggests that the cross-sectional shape of the respective features will ensure that when the thermally-active recording layer is spin coated over the clear replica hybrid disc, the proper respective depths will be achieved. This would be very unlikely to occur if the pre-grooves have a triangular cross-section. As mentioned above, the manner in which Nakagawa creates the pre-grooves (reduced exposure of the photoresist in those areas) would make it highly unlikely that this method could achieve the desired rectangular cross-section pre-grooves, or that such masters, even if generated, could produce replicas meeting Orange Book specifications. In other words, Nakagawa's simple expedient of allowing the cross-sectional shape of the respective features to cause the desired difference in thermally-active recording layer thickness would probably not succeed.

Ultimately, if Nakagawa's teachings were followed, using modern high speed dyes, not only would tracking be severely compromised, particularly in the hybrid disc R band(s), but also HF detection of the R band pits would likewise be more difficult, as these pits would essentially be squeezed into the narrow pre-grooves and "bulge" radially outwardly from them. The most probable result of following the Nakagawa teachings, therefore, would be hybrid discs that are simply incapable of meeting either Orange or Red Book specifications. Hybrid discs that fail to meet the specs are useless.

Yanagimachi (U.S. Pat. No. 5,696,758), another photoresist mastering method, essentially attempts to follow the Nakagawa teachings. By exposing the photoresist less in the R bands than in the ROM bands, as Nakagawa teaches, and further by employing an exposure level in the ROM lands that is less than the exposure level of the ROM pits, Yanagimachi creates grooves in the ROM area of the clear replica hybrid disc that are narrower and shallower than the pits which they "connect." When the thermally-active recording layer is then spin coated over the clear replica hybrid disc to create the final hybrid disc, there will be even less of the ROM groove remaining. This is in addition to the problem, as in Nakagawa, that the R band pits and grooves will not readily lend themselves to HF or PP detection. Furthermore, Yanagimachi does not teach how to independently control the width and depth of the ROM grooves, the ROM pits and the R band grooves. One of ordinary skill would know that if a PR generated feature is narrowed by reducing the laser power of a single beam, its depth would be correspondingly reduced. Yet Yanagimachi, which definitely teaches the use of a single beam (Column 6, lines 23–32), offers no assistance in this regard. Thus, the Yanagimachi teachings are, if anything, even less instructive than those of Nakagawa in enabling those of ordinary skill to manufacture hybrid discs that might meet Orange and Red Book specifications.

Ha (U.S. Pat. No. 6,212,158) differs from Yanagimachi primarily in certain parametric values. Specifically, Yanagimachi specifies a ROM pit depth between 250 and 350 nanometers with a ROM groove depth between 30 and 170 nanometers, while Ha specifies a ROM groove depth of more than 170 nanometers. Indeed, Ha refers to Yanagimachi, pointing out (Column 1: lines 36–43) the difficulty in creating acceptable hybrid discs incorporating the latter's wobbled, depth modulated (ROM area) groove. Accordingly, Ha modifies Yanagimachi with different parametric values, based on a very similar concept, and Ha's claims are essentially "written around" Yanagimachi. But Ha adds nothing material to the foregoing two teachings to facilitate hybrid disc production.

In summary of the prior art known to the applicants, there is no published teaching, either alone or in any reasonable combination, which will enable a practitioner of ordinary skill to reliably, repeatedly and efficiently manufacture hybrid discs meeting Orange Book and Red Book specifications. This may, or may not, be because all publications known to the applicants rely on the photoresist method of mastering the hybrid discs, which, as has been shown above, is extremely difficult, if not impossible, to utilize in producing masters that can be replicated to manufacture hybrid discs meeting the required specifications. Whatever the reasons, it appears that in-spec hybrid discs cannot be commercially manufactured in accordance with the prior art.

Therefore there is a need for a method, an apparatus and resulting pit, land and pre-groove geometry in hybrid disc masters, by which replicated hybrid discs, meeting all applicable manufacturing specifications, may efficiently, rapidly and reliably be manufactured.

BRIEF SUMMARY OF THE INVENTION

It is, therefore, the ultimate goal of this invention to provide master hybrid CD and DVD discs, and master hybrid discs of other formats (e.g., CD-RW), including those with even greater data density, from which hybrid discs meeting all applicable specifications may be reliably produced in a high-speed commercial manufacturing environment by those of ordinary skill. Accordingly, it is a goal of this invention to provide apparatus and a method by which such master hybrid discs may be efficiently created. It is likewise a goal of this invention to provide a method of creating such hybrid disc masters by a thermal mastering process.

In particular, it is a goal of this invention to provide hybrid disc masters whose ROM pit and land configurations, and R band pre-groove configuration, facilitate molding to efficiently yield clear replica hybrid discs which, when converted into final hybrid discs, by conventional means, in a commercial manufacturing environment, will meet applicable industry specifications.

It is another goal of this invention to provide improved masters for CD-RW hybrid discs and MO discs, and thus to provide improved hybrid discs manufactured therefrom.

According to the invention, in its most fundamental aspect, the hybrid disc master ROM pits are recorded in ROM grooves that are wider, in transverse extent (as defined below), and shallower than the ROM pits, the ROM lands typically comprising those portions of these ROM grooves intervening between consecutive ROM pits. In certain embodiments, the ROM pits may be up to 110% as wide as the ROM grooves, when each are measured at half depth. In some embodiments, both ROM grooves and R band grooves are provided in the hybrid disc master, each being wider than the ROM pits, the ROM grooves and R band grooves typically constituting one continuous spiral groove extending through both the ROM and R regions.

A dual beam recording apparatus produces the hybrid disc masters, according to the preferred embodiment of the invention. The intensity of the individual beams, and their diameter at the hybrid disc master surface, may be individually selected, so that the groove and pit configurations in the master may be chosen and optimized to ultimately yield in-spec final hybrid discs. In the preferred embodiment, the beam creating the ROM groove will lead the beam creating the ROM pits, as the master disc revolves. In other embodiments, the two beams will coincide, or the groove-creating beam will lag the pit-creating beam.

The invention, in most embodiments, utilizes a thermal mastering process. This will ensure that the pit and groove surfaces will be smooth and sloped, thus further facilitating efficient, high-speed clear replica molding. In some embodiments the berms that would tend naturally to form at the radial extremities of the pits and grooves in the hybrid disc masters, by the natural expulsion processes inherent in thermal mastering, are reduced or even eliminated. This further facilitates production of final hybrid discs meeting all applicable manufacturing specifications. This is accomplished, in the preferred embodiment, by causing one beam to create the pits, while the second beam, whose beam width at the surface is relatively wider than the first beam, but whose intensity is less, to minimize or even to eliminate the berms as they have been, or would otherwise be, created. In some embodiments, the latter second beam is activated during the entire creation of a ROM band, while the first, more intense and narrower beam, is activated and deactivated in response to data-based beam modulation, resulting in a succession of ROM pits and lands, where the lands are a continuation of the groove in which the relatively narrower pits reside.

In certain embodiments, a single, dithered beam is utilized, where both the instantaneous beam intensity and its dither pattern are controlled so that, in effect, such a dithered beam duplicates a dual beam. Indeed, it will be understood, in reference to prior art single beams, that what is meant is a non-dithered single beam, as dithered writing beams are apparently not taught in the prior art.

The embodiments relating to hybrid CD-RW mastering differ from those relating to hybrid CD-R/DVD-R mastering in certain respects, as will be described briefly at the conclusion hereof.

A number of embodiments of the invention will be described below. Certain of these are specifically illustrated in the Drawing.

BRIEF DESCRIPTION OF THE DRAWING

FIG. 3 a schematic plan view of a ROM or R band data pit in a hybrid disc illustrating the parameters of single beam (PP) CD tracking.

FIG. 4 is a schematic plan view of adjacent successions of data pits and intervening lands in a hybrid disc, illustrating the parameters of playback, triple beam CD tracking.

FIG. 6 is a plan view of a succession of two data pits and intervening land area formed in hybrid disc master or clear replica hybrid disc ROM area according to the preferred embodiment of the invention.

FIG. 23a is similar to FIG. 22, but enlarged to display dimensional parameters.

FIG. 23b is similar to FIG. 23a, but illustrates a slightly different measurement convention, as employed in Tables 2 and 3, and in FIG. 25.

DETAILED DESCRIPTION OF THE PREFERRED EMBODIMENTS

Figure 1:
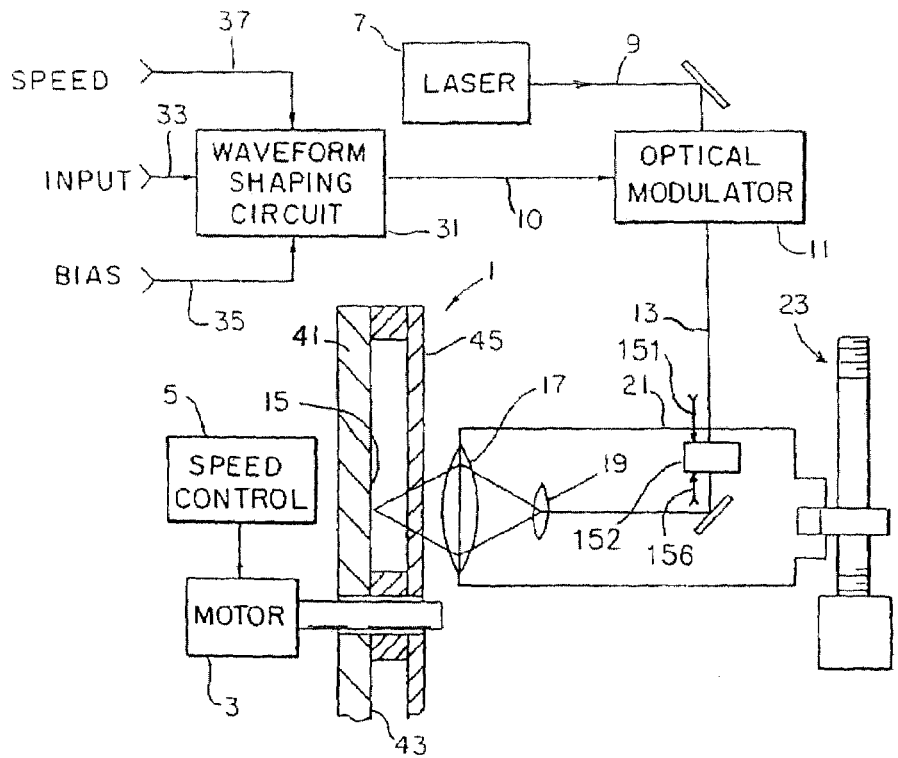
FIG. 1 is a generalized block diagram of a hybrid disc mastering apparatus, without the improvements of the present invention, into which the preferred embodiment of the invention may be incorporated, where a gas laser write beam is employed.

For convenience, the ensuing discussion will initially concentrate on CD hybrid disc manufacture utilizing dye-polymer mastering, although the invention is by no means limited to that format or context. In particular, it will be noted that, while reference will often be made to the dye-polymer method, any suitable thermal process for forming the desired features in the hybrid disc master—in contrast, e.g., with prior art PR, or other photoengraving, processes—could be utilized.

Once again, "thermal process" refers generally herein to any process by which controlled, thermally induced microscopic changes may be made in a medium, in the context of hybrid disc mastering. In such a thermal process, an optical (e.g., laser) or quasi-optical (e.g., ion or electron) beam causes formation of a three-dimensional feature in or on a layer of substantially uniform composition as the result of heat locally generated by the beam. This is in contrast to a purely optical method, such as the PR method, where it is the quantity of light that ultimately effects formation of the feature, rather than heat generated by the beam.

The ensuing discussion will proceed as follows: First, the improved method of recording a hybrid disc master, employing the thermal dye-polymer process, will be thoroughly discussed. The various configurations of the resulting features of the hybrid disc master will then be identified and explained, in terms of their preferred interrelationships ensuring that the final hybrid discs, and later-recorded hybrid discs, will reliably meet Orange Book specifications, and that the ROM areas of thereof will reliably meet incorporated Red Book Specifications. Following this will be a brief discussion of the process of replicating such a hybrid disc master to produce clear replica hybrid discs, since CD manufacturing from recorded masters is well known, and no significant departures from conventional CD replication methods are necessary in clear replica hybrid disc production. Then, since spin coating and associated processes are well known and dye manufacturers frequently specify such procedures in detail, in connection with recording speed certification, this discussion will conclude with a brief review of the steps in converting the clear replica hybrid discs into final hybrid discs that will meet applicable specifications. Finally, there will be a brief summarizing discussion generalizing these teachings in respect to different formats, both present and future.

It should also be noted that, since the dimensions and relative configurations of many of the corresponding features of the hybrid disc master and of the clear replica hybrid discs replicated from them are virtually identical, it will be understood that many of these references, below, to hybrid disc masters will apply equally to clear replicas. The final hybrid discs, with various layers applied to their upper surfaces, will display features that may not be identically shaped or dimensioned in respect to corresponding features in the master, but these features in the final hybrid discs will be correctly read on playback. Similarly, tracking of the master and replicated final hybrid discs would be virtually identical in concept, and the discussions on this subject will likewise apply to either structure.

The initial discussion will deal with recording the ROM data pits in the hybrid disc master. It should initially and consistently be noted that none of the Figures in the Drawing are drawn to scale, but are merely illustrative of the various features and concepts illustrated.

Figure 2:
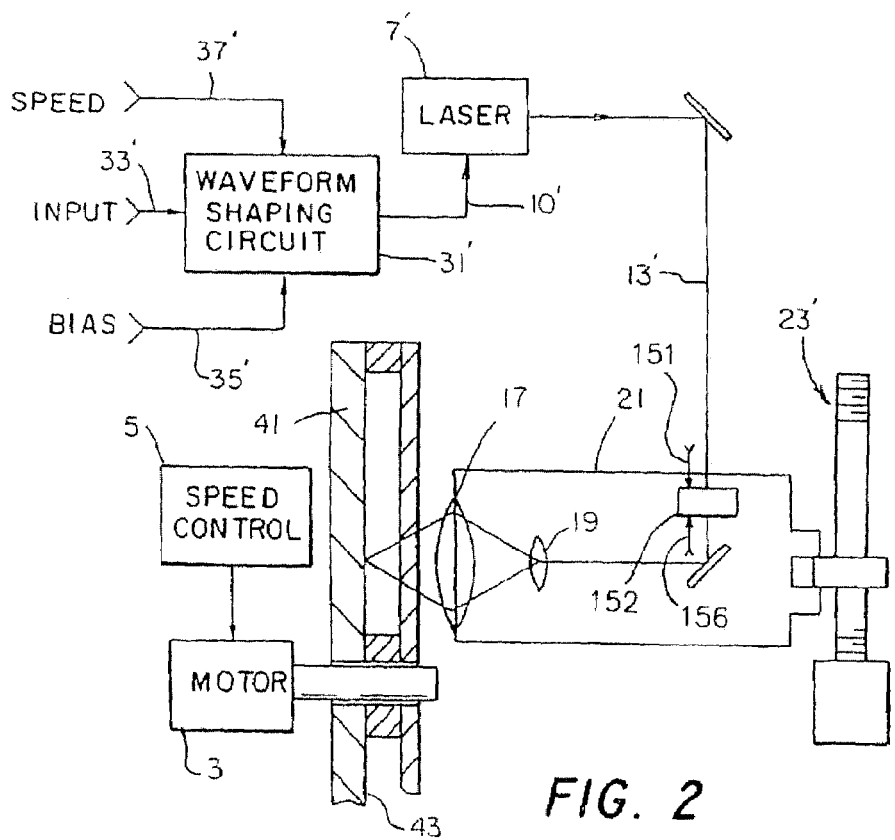
FIG. 2 is a generalized block diagram of a hybrid disc mastering apparatus, without the improvements of the present invention, into which the preferred embodiment of the invention may be incorporated, employing a diode laser write beam.

FIGS. 1 and 2 are simplified depictions of the apparatus employed in creating the hybrid disc masters, offered primarily to illustrate its overall configuration. Additional elements of the apparatus, relating specifically to use in hybrid disc mastering, are illustrated in FIGS. 13–17, and will be discussed in connection with those figures.

Referring now to FIG. 1 and to the '129 patent, the hybrid disc master 1 on which the ROM data pits and intervening lands are recorded is rotated by a spindle motor 3, which is controlled by a speed controller 5. A gas laser 7 forms a write beam 9 of a particular wavelength. Because of the use of a gas laser in this embodiment, the write beam passes through an external optical modulator 11, which varies the intensity of the write beam in accordance with a drive signal on line 10, from the waveform shaping circuit 31. As suggested above, the optical modulator 11 might, for example, comprise an AOM or, a faster-response EOM (electro-optic modulator).

The modulated beam 13 is directed to the disc master 1 and is focused to a spot 15 on the active surface 43 by appropriate optics, as generally described above. These optics preferably include an objective lens 17 and a beam expanding (i.e., condenser) lens 19, which spreads the modulated beam 13 to fill the aperture of the objective lens 17. The numerical aperture ("NA") of the objective lens is chosen so that the diameter of this spot will be approximately 0.5 micron (in the case of CD recording), which is comparable to the wavelength of typical laser beams now employed. The lenses are mounted on a carriage 21 to allow radial movement of the spot 15 relative to the center of the disc 1. This is accomplished by means of a generalized translational drive system 23, whose details would be well within the skill of the ordinary practitioner.

Alternatively, while FIGS. 1 and 2 illustrate radial movement of the spot 15 controlled by a translational system 23 that moves, while the axis of rotation of the hybrid disc master remains stationary, the opposite might be true. That is, the carriage position could be fixed, in which case the disc apparatus would be moved to cause the axis of rotation of the disc to be translated radially, in synchronization with the timing parameters of the writing process. In either case, assuming proper tracking, the beam would be continuously moved, relative to the center of rotation of the disc, to generate the desired narrowly spiral data track(s).

In the preferred embodiment, the drive signal for the optical modulator 11 is formed by the waveform shaping circuit 31, as described in the '129 patent, whose purpose is to convert the sequence of EFM-coded data pulses and intervening "off" spaces into a resultant sequence of spaced drive pulses, the trailing regions of which each display a moderated decline in amplitude. This moderated decline may, for example, comprise a linear ramp, an exponential decay, a series of steps of progressively declining amplitude or a double-step (where the intermediate step is perhaps at half the "on" amplitude at the initiation of the trailing region). Other moderated decline profiles may also be employed in the trailing region, it being understood that the purpose of any moderated trailing region decline is to cause heat generation in the active dye-polymer layer 43 at the trailing end of formed pits to decrease more gradually than would otherwise result if these drive pulses displayed a single abrupt drop in amplitude from the "on" write level to the "off" base level. For convenience, every moderated trailing edge decline profile promoting that desired result will herein be interchangeably referred to as a "ramp."

An effect of any such trailing edge ramp is described in the '129 patent as causing the trailing ends of the formed data pits to become tapered, as the latter term is broadly defined above. The leading ends of the pits will already be tapered because a certain brief passage of time is required after the leading edge of a laser pulse (i.e., initial activation of the spot 15 at the active layer 43) before the full heat buildup is felt in that rapidly moving medium. This leading end taper can be blunted somewhat by boosting laser power at the pulse leading edge, as is commonly done, although it is essentially impossible to entirely eliminate it. Thus, a progressively broadening taper will form at the leading edge of the pit after the corresponding drive pulse is initiated. The moderated decline in amplitude at the trailing edge of the laser pulse will then result in a progressively narrowing taper at the trailing end of the pit, mirroring the taper at the leading end. This creates geometric symmetry between the selectively-tapered pit trailing and leading ends, which facilitates HF detection of the pit-land transitions, as disclosed in the '129 patent.

The present invention does not, of course, depend on inclusion of the teachings of the '129 patent, and improvements brought about by application of the present teachings will be realized, even if '129 patent principles are not included. However, it is believed that superior results are obtained if the present teachings are combined with those of the '129 patent.

Likewise, while the present invention does not depend on inclusion of the teachings of U.S. Pat. Nos. 5,608,711 and 5,608,712, incorporated herein by reference, a write strategy employing the differential run length adjustment there taught would be highly beneficial, in connection with the present invention, to reduce systematic jitter. This is because the ability to differentially adjust run lengths in disc masters, as taught in those patents, provides the needed flexibility to pre-compensate for changes in the ROM pit lengths in the final hybrid discs, resulting from dye application, e.g., the tendency for many dyes to alter the shape of ROM pits.

The waveform shaping circuit 31 includes an input 33 for receiving the data to be recorded and may also include another input 35 for receiving a drive signal bias control for adjusting the average intensity of the modulated beam 13. Since the rotational speed of the disc varies in order to maintain constant linear speed of the spot 15 relative to the disc, the signal processing system may include a third input 37 for receiving a signal indicative of the instantaneous relative speed, perhaps generated from the speed control 5.

The hybrid disc master 1 will generally include a substrate 41 and the active (dye-polymer) layer 43 coated onto the substrate. A transparent member 45 may be interposed between the active layer and the objective lens 17 to prevent dust and other contamination from settling on the active surface. Alternatively, the active layer may be formed on the inner surface of the transparent member, or any other convenient configuration of elements in the hybrid disc master 1 may be chosen according to particular circumstances and preferences, which may feature first surface recording, as shown in FIG. 1, or second surface recording.

FIG. 2 is identical to FIG. 1 except that FIG. 2 illustrates the configuration that might be employed if a diode laser 7' were utilized. Since a diode laser can respond virtually instantaneously to its drive signal input, no external optical modulator is required in this application. Rather, the output from the waveform shaping circuit 31' may, through line 10', constitute the direct drive signal for the laser 7'. Here, the modulated beam 13' is directly emitted from the laser 7'.

In the embodiment illustrated in FIG. 1, a single waveform shaping circuit 31 is shown. Of course, there could be a plurality of waveform shaping circuits collectively driving the optical modulator 11, perhaps through a suitable intermediary summing circuit. Likewise, in the embodiment illustrated in FIG. 2, a plurality of waveform shaping circuits 31', or a plurality of sub-circuits within the waveform shaping circuit, could be utilized. In either of the latter cases, each could be implemented to form, from the input 33' and/or from another input (not shown), a respective portion of the desired composite laser drive pulse (e.g., an amplitude boost at or near the pulse leading edge, a leading edge delay, or a trailing region amplitude decline ramp of any desired shape). These components could be summed by an intermediary element (not shown) or they could all be fed into the laser 7' through line 10', allowing the laser itself to act as a summing element.

As shown in FIG. 3 (where the arrow indicates the direction of disc rotation), the result, in accordance with either of these two alternative-laser embodiments, would be generation of a track of elongated data pits 50, each displaying a leading end 54, and trailing end 52 and a main portion 53, extending longitudinally along the pit axis 64. It will be observed, from FIG. 3, that the trailing end of a ROM data pit, if produced in accordance with the teachings of the '129 patent, will be tapered as a mirror image of its tapered leading end. These elongated pit ends shown in FIG. 3 illustrate one typical shape included in the more general taper concept defined above and applied in reference to the '129 patent and the present invention. This provides a desirable, geometrically symmetric, tapered pit configuration to facilitate accurate detection of pit-land transitions, and thus to improve reliable retrieval of the successive pit and land lengths to reconstruct and de-code the original data recorded on the hybrid disc master. While such data pits are typically elongated, as shown in FIG. 3, there may well be present or future of data recording formats in which the data pits or other data marks are not elongated, but rather are of similar extent in the transverse and longitudinal directions, or may even be transversely of greater extent than longitudinally. Indeed, even in the case of elongated pits or other data marks, the longitudinal extent may not be much greater than the transverse extent, particularly in the case of low run length (e.g., 3T) marks. Accordingly, the teachings herein (or in the '129 patent) are by no means limited to data pits or lands or other data marks that are necessarily longer than their width.

FIG. 3 illustrates single beam (PP) tracking, in reference to the hybrid disc master, the final hybrid disc or a CD writer recording onto the latter. Here, a single read beam 60 is utilized as the light source for HF (in the hybrid disc) and PP detection. The reflection of this beam is suitably passed to a conventional detector (not shown), in which the reflected beam is split into two equal, semi-circular components, separated by a division that is parallel to the tracking direction of the beam. As previously mentioned, HF detection comprises observing the instantaneous amplitude of light reflected perpendicularly from the disc surface—by summing the output of the two detector components—and pit-land transitions are registered when the quantity of detected light reaches an established value. Too much light indicates that the read beam is above a land area, while too little indicates that it is above a pit. PP detection comprises comparison of the light diffracted from the disc surface, as received in the two detector components, by subtracting the output of one detector component from that of the other, to produce a servo feedback to move the read beam radially until the two halves produce equal readings. FIG. 3 shows that the diameter of the read beam 60 is approximately double the width of the pit 50, as is generally the case.

FIG. 4 illustrates the triple-beam tracking system commonly employed in those CD players, where three beams 61, 62, 63 are utilized. The central beam 61 is merely the read beam, corresponding to the read beam 60 in the single beam tracking system illustrated in FIG. 3. The forward beam 62 is offset by approximately ¼ of the track pitch, TP, to one side of the tracking axis of the tracking apparatus, while the rear beam 63 is offset by an identical amount to the other side. As discussed above, TP, the radial axis-to-axis distance between adjacent data tracks or track portions, is generally about three times the pit width, as shown. Unlike single beam tracking, the reflection from central beam 61 is not split, and serves only for HF detection and, in some systems, focusing. Tracking detection from the tracking sensors associated with the other two reflections (from beams 62 and 63) is compared, and appropriate radial adjustment is made continuously until the tracking axis aligns with the longitudinal axis 64 of the track of pits. Since HF and tracking detection with single-beam and triple-beam configurations are well known in the art, the respective apparatus need not be illustrated or further discussed.

Figure 5:
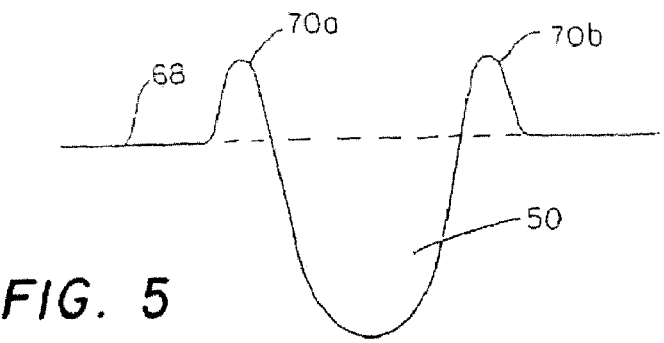
FIG. 5 is a transversely sectional view of a ROM data pit formed in a hybrid disc master or clear replica hybrid disc by a thermal process without the improvements of the invention.

In the ensuing discussion of FIGS. 5 to 12, reference will be made to the configurations of various features in the hybrid disc master, as there illustrated. Since the clear replica hybrid disc features are essentially identical to the corresponding features in the hybrid disc master from which the clear replica is replicated, it will be understood that reference to the configurations of features in the hybrid disc master, in the discussion of these Figures, will apply equally to corresponding features in the clear replica hybrid discs. It will likewise be understood that since the particular selection of recording dye to be applied to the clear replica hybrid discs is left to the practitioner, presumably following manufacturer specifications and instructions, it is impossible to illustrate the corresponding configurations in the final hybrid discs, beyond the approximations shown in FIGS. 23 and 24. Since it is only the final hybrid discs and later-recorded hybrid discs that must meet Orange Book and incorporated Red Book specifications, it will be likewise understood that optimization of the mastering and manufacturing process, in the manner discussed below, based on the actual materials, apparatus and processes chosen by the practitioner, is required to achieve the results facilitated by the present invention. In other words, improved mastering techniques and apparatus are herein taught, which, if properly employed by one of ordinary skill in the art, will facilitate system optimization leading to maximization of Figure of Merit in final hybrid discs beyond the level previously achievable FIG. 5 illustrates the sectional configuration of a ROM pit 50 produced in the hybrid disc master created by the dye-polymer method just described. It will be noted that berms 70a, 70b rise above the surface 68 of the disc. As explained above, this is a natural consequence of the plasticization component of the expulsion process by which these pits are created. It will be noted that the presence of these berms changes the effective phase depth of the pit. Optimization of the hybrid disc mastering parameters, based on this configuration, may yield final hybrid discs offering effective HF detection with a reasonable tracking signal. But because of dichotomy between PP and HF detection requirements, recording beam intensity must be set so that in the final hybrid discs the effective pit phase depth is approximately 3 $\lambda/16$. But this optimizes neither HF detection (requiring a $\lambda/4$ effective phase depth) nor tracking (requiring a $\lambda/8$ effective phase depth).

FIG. 6 illustrates the improved configuration of ROM pits and intervening lands in the hybrid disc master, implemented by the preferred embodiment of the present invention. It will be seen that here a relatively wide, shallow groove 75 is provided, running along the longitudinal axis of the sequence of pits and lands, within which are the sequence of ROM pits themselves. The width of this groove is greater than that of the ROM pits. This relatively wide groove of the present invention is in clear contrast to the narrow inter-pit groove taught in Schoofs, and the similarly narrow grooves to connect succeeding pits taught in the Nakagawa, Yanagimachi and Ha references, discussed above, whose intended purpose appears to be to facilitate tracking, but which, on account of their resulting dimensions, according to the other teachings of those references, would actually fail to accomplish this purpose to any meaningful extent. This advantage of ROM pit, ROM groove and R pre-groove mastering flexibility offered by the present invention will result in high quality final hybrid discs, when the manufacturing process is optimized, as discussed below.

The latter becomes clear when one recognizes that a wide groove created by a single beam is necessarily a deep groove. While the increased width might promote better PP tracking, the increased depth actually impedes it. For example, the Ha reference teaches the creation of such relatively deep—$\geq 170$ nanometer—pre-grooves, which will, indeed, provide a significant increase in PP detection, for improved tracking. But the manner in which Ha provides these relatively deep pre-grooves actually compromises the width of these grooves and of the ROM pits. The resulting tradeoff offers no overall advantage.

While provision of a relatively wide, shallow ROM groove of selective dimensions by the present invention will facilitate tracking—at least far more readily than in the prior art—its principal function is to provide increased R band pre-groove volume to offer flexibility in application of state-of-the-art high-speed recording dyes in accordance with manufactures' instructions, which often specify preferred groove configurations in order to obtain the manufacturer's recording speed certification. One such high-speed dye, currently popular among CD-R manufacturers, is Ciba Ultragreen MX. The specifications and instructions for use of this particular dye are available upon request to Ciba, a well-known source of CD-R dyes.

As CD-R recording speed continues to increase, further improved dyes, specifically formulated for even higher-speed recording, will continue to be utilized. These prior art teachings provide no guidance as to how to provide such increased groove volume, commonly specified by manufacturers of such high-speed dyes, while maintaining good PP and HF detection in both ROM and recorded R bands, since they principally rely on a single write beam to expose a photoresist active layer. However, the present invention provides independent control of groove width and groove depth, through use of two independently controllable beams, or a dithered beam, thus providing the flexibility needed to satisfy all of these requirements. Indeed, the present invention allows independent control and optimization of the transverse configurations of all the features.

It should also be noted that because the principal embodiment of this invention utilizes dye-polymer hybrid disc mastering, it is not difficult to produce pits, ROM grooves and R band pre-grooves of any desired depth in the disc master. This is because of the mechanics of this process, which, as explained above, tends inherently to produce, in the hybrid disc master, smoothly-contoured, slope-sided depressions without surface roughness, and which can produce such depressions therein of any desired depth simply by suitably adjusting the write laser intensity. This means that hybrid disc masters created according to the present invention will be far easier to replicate by normal molding processes than the rough-sided PR-generated features taught in the prior art, e.g., the rectangular cross-section features that Nakagawa hopes to create by methods that are not readily apparent.

Accordingly, with this improvement PP tracking in the hybrid disc is facilitated by the increased width (but controlled depth) of the ROM groove, which will be seen by a CD player's single beam detector in the same manner as a wider pit would be seen. Additionally, in such a single-beam environment, HF detection from the hybrid disc can be independently improved by providing optimal, relatively narrower and deeper pits, without regard to the conflicting requirements of PP tracking, which may now be independently optimized by provision of the wide, shallow groove. Such narrower pits within relatively wide, shallow grooves offer the additional benefit of reducing HF cross talk in the hybrid disc between radially adjacent data tracks. Independent optimization of HF and PP detection, and reduction of cross talk, are important results enabled by this embodiment of the invention.

Figure 7:
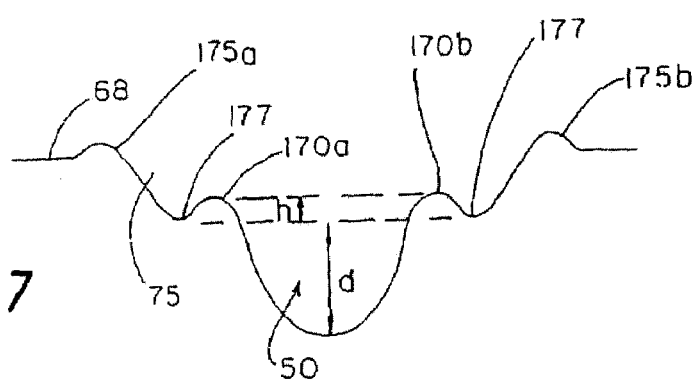
FIG. 7 is a transversely sectional view of a pit incorporated within a groove, formed in a hybrid disc master or clear replica hybrid disc ROM area according to the invention, taken through section 7—7 of FIG. 6.

Indeed, HF detection from the final hybrid disc can actually be further improved by this means. If the groove 75 is implemented in the hybrid disc master by the method described below, the berms 70a, 70b can be greatly reduced in height, if not entirely eliminated, as shown in FIG. 7. This provides a ROM pit shape in the final hybrid disc whose effective phase depth could be made to coincide more closely with the optimal $\lambda/4$, than might be possible without the improvements offered by this invention. Thus, viewing the final hybrid disc, the HF detector would see the bottom of a groove corresponding to the bottom 77 of the groove 75 in the disc master as it would otherwise have seen the final hybrid disc surface, itself, and would thus see a practically berm-less pit of the proper width and an effective phase depth providing the desired $\pi$ phase shift. At the same time, the PP detector would see, in the final hybrid disc, a "tracking feature" with a desirably greater width, and whose effective phase depth is closer to the $\lambda/8$ required for the optimal $\pi/2$ phase shift for PP detection.

FIG. 7 shows that the ratio of the height h of the berms 170a,b to the depth d of the pit 50 in the hybrid disc master is considerably less than in the section shown in FIG. 5, which does not incorporate any of the improvements of the present invention. These vertical dimensions are measured from the vertical index level of the point 177 at which the right berm 170b begins to rise above the groove level 77. As well as improving Figure of Merit (by providing a wide, shallow tracking groove for improved PP detection without compromising HF detection of the ROM pits themselves), the reduction in berm height, thus realized, also facilitates accurate replication from the hybrid disc masters by reducing the quantity of material that might tend to cling to shallower crevices displayed in the resulting stampers. This is a very important advantage of the invention, in respect to the PR-based concepts disclosed in the cited references.

It will also be seen, from FIG. 7, that smaller berms 175a,b rise from the surface 68 of the disc at the respective edges of the groove 75. But these will have little effect on PP or HF detection.

Figure 8:
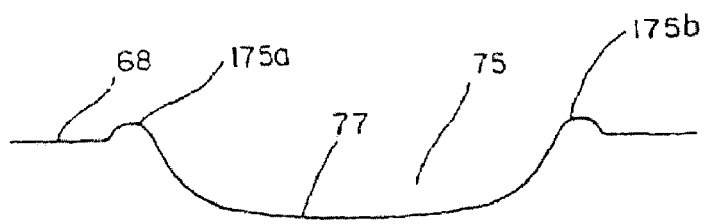
FIG. 8 is a transversely sectional view of the land area in a hybrid disc master or clear replica hybrid disc ROM area according to the invention, taken through section 8—8 of FIG. 6.

As shown in FIG. 6, the groove 75, itself, could continue in the land areas of the track of pits and lands, to ultimately provide a corresponding feature in the final hybrid disc having an effective depth of $\lambda/8$, facilitating tracking between pits by providing a wide, relatively flat bottom 77 of the groove of consistent depth through its entire width, as shown in FIG. 8. This solves the problem only partially addressed by Schoofs (and ignored by Nakagawa, Yanagimachi and Ha), whose disclosed land area groove (created by reducing the between-pit write intensity to generate a just-above-threshold condition in the moving medium) is too narrow for optimized PP detection, and which, by logical extension, would inhibit HF detection of the pit/land transitions if the between-pit groove were widened (and correspondingly deepened) by a less extreme write intensity reduction. At least as importantly, the present invention, with its independent control of groove width and depth, permits greater groove volume without greater depth, thus facilitating faster recording on the R bands of the resulting hybrid discs by facilitating use of state-of-the-art high speed recording dyes.

Figure 9:
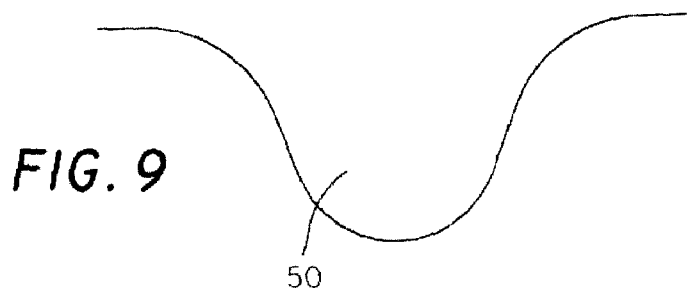
FIG. 9 is a transversely sectional view of a pit in a hybrid disc master or clear replica hybrid disc ROM area, according to another embodiment of the invention.

Virtually berm-less pits 50, as shown in FIG. 9, may be created by adjusting the parameters to cause a slight increase in groove width in the hybrid disc master, together with a corresponding slight increase in the width of the ROM pits formed within the groove. These parameters include beam intensities and diameter, which may be adjusted individually or jointly to achieve the following results.

Proper selection of groove width can cause one of the two berms forming in the new groove in the hybrid disc master to overlap the downward slope of the adjoining berm of the already formed, radially adjacent groove. In other words, the two adjacent berms will merge to form a flat-topped region between the adjoining grooves. This process repeats itself as further radially adjacent grooves are created, resulting in flat areas between all radially adjacent track portions.

Proper selection of the width of the ROM pits within the groove in the hybrid disc master causes the berms in the pits forming within that new groove to be minimized or eliminated in a similar manner. If the parameters are adjusted to cause the pit to be only slightly narrower than the groove within which it is being created, the berms forming at either side of the new pit will coincide with the downward slopes of that groove. This eliminates both of those pit berms in the hybrid disc master and ultimately in the hybrid disc itself.

The resulting profile essentially becomes the superposition of the profiles of the groove and the pit formed within it. In effect, therefore, the groove resulting from these two adjustments in the hybrid disc mastering process becomes the pit, only somewhat wider, and now berm-less. This result has been shown to occur through repeated experiments, and can be optimized by fine adjustment of the hybrid disc mastering parameters.

FIG. 9 illustrates the latter embodiment of the invention. As described above, in this embodiment of the hybrid disc master there is no ROM groove at all, except in the land areas, and the resulting ROM pit 50 is rendered essentially berm-less, and with a shallower slope on either side. That facilitates PP tracking without compromising HF detection, in the final hybrid disc. Tracking detection is improved because the shallower side slopes tend to reflect a greater proportion of incident light away from the vertical. Yet HF detection is not compromised at all, because effective pit depth is maintained at the conventional $3\lambda/16$. The net result is an overall improvement in Figure of Merit, which is a benefit of the present invention.

Likewise, reduction in berm height—and, particularly, effective elimination of berms by careful parameter selection, as described herein—will reduce cross talk between adjacent data tracks. This is particularly true in present and future applications featuring relatively narrower track pitch, which this embodiment of the invention particularly facilitates.

Just as independent control of the two write beams (or single dithered beam) facilitates precise control of the transverse configuration of the ROM pits and groove, use of these two, independently controlled beams or dithered beam likewise permits creation of pre-grooves in the R bands of the hybrid disc master of any desired transverse configuration and track pitch.

Thus, Figure of Merit in CD hybrid disc mastering applications may be improved by the present invention even without the added PP-facilitating groove. Furthermore, such a groove-less, berm-less profile, as shown in FIG. 9, would be nearly ideal for the R band pre-grooves, whereas the embodiment shown in FIG. 7 might not be as desirable for that particular application. Recording R band pre-grooves would simply require a fixed intensity of each write laser beam, rather than a data signal modulation of either beam intensity. But it is an important feature of this invention that the mode of driving the write laser to record the various features can be selectively programmed, in a conventional manner, to suit the particular requirements of the specific sequence and the prescribed characteristics of the ROM and R bands being recorded. In particular, because the dual-beam dye-polymer hybrid disc mastering method is utilized in the preferred embodiment, such switching from one mode to another is much simpler than in the case of prior art single beam PR mastering, because most of the problems inherently introduced by the PR method are absent.

A number of methods and corresponding apparatus can be utilized for implementing various embodiments of the present invention. Those involving groove formation will first be discussed. It will be understood that an R band pre-groove is simply a groove of selective dimensions, recorded in the R band(s), as will be discussed below.

Figure 13:
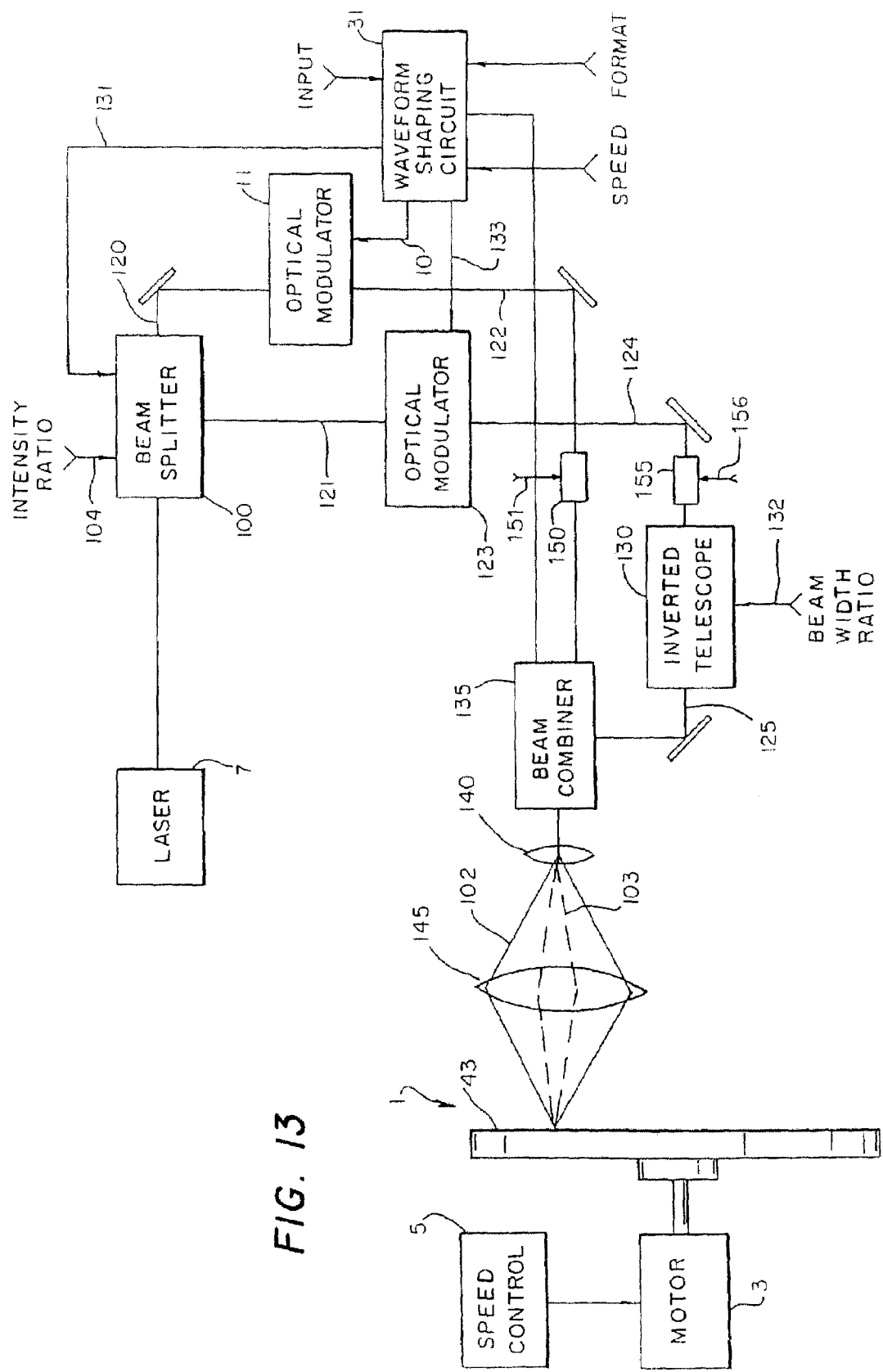
FIG. 13 is a generalized block diagram of a hybrid disc mastering apparatus according to the preferred embodiment of the invention, illustrating beam splitting to provide a ROM pit writing beam and a ROM groove writing beam, in reference to the apparatus shown in FIG. 1.
Figure 14:
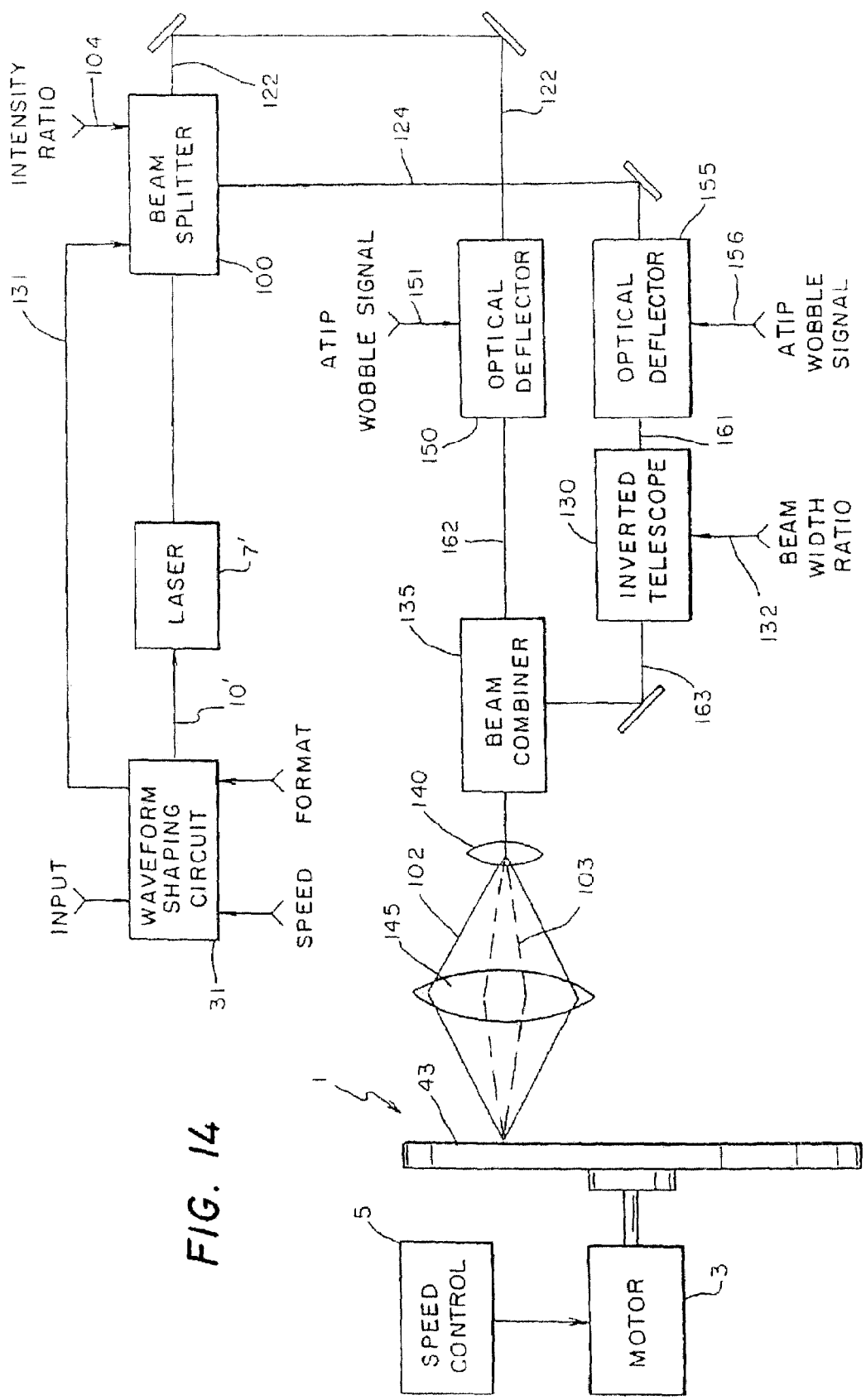
FIG. 14 is a generalized block diagram of a hybrid disc mastering apparatus according to another embodiment of the invention, in reference to the apparatus shown in FIG. 2.
Figure 15:
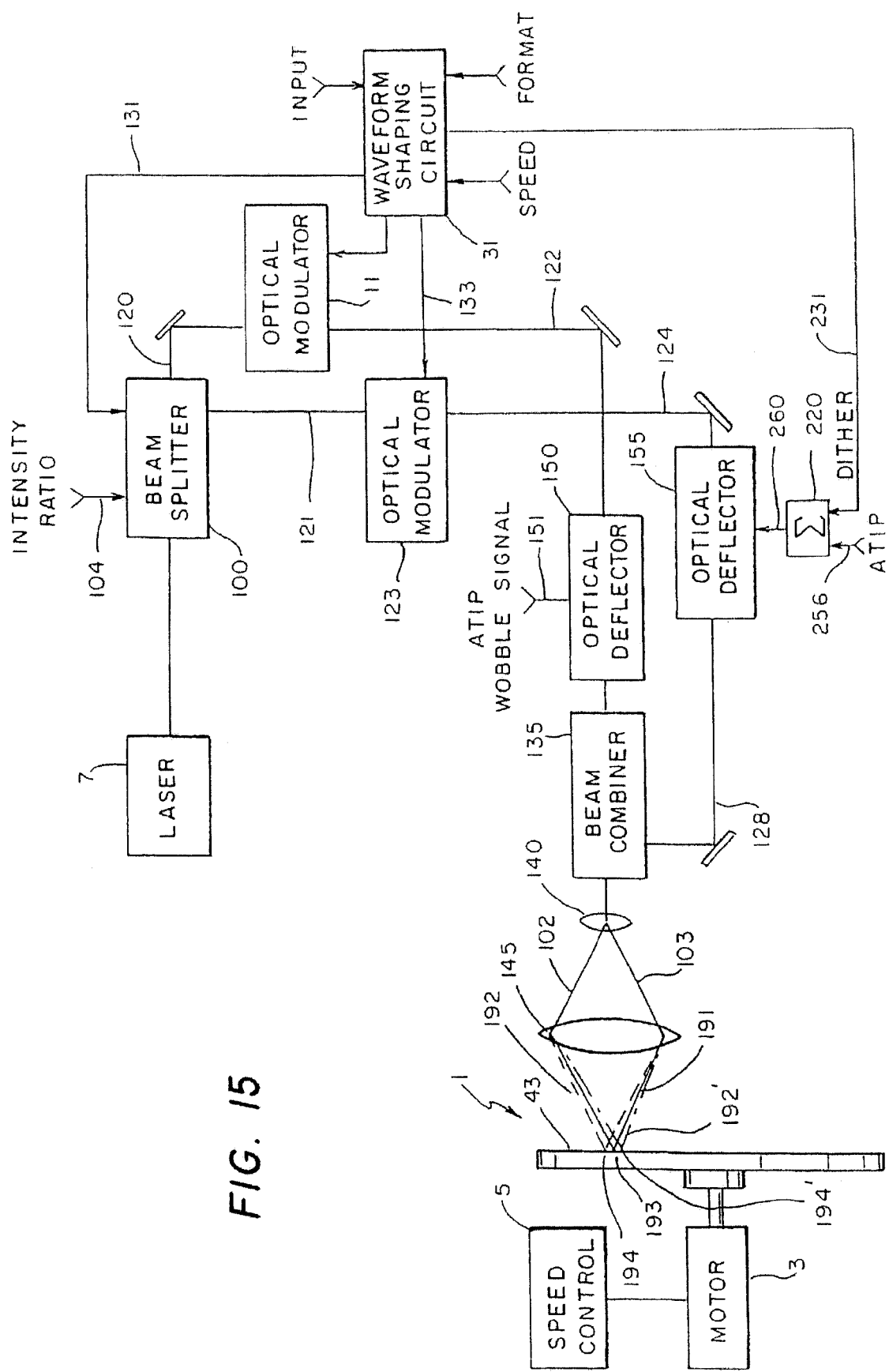
FIG. 15 is a generalized block diagram of a hybrid disc mastering apparatus according to yet another embodiment of the invention, in reference to the apparatus shown in FIG. 1, in yet another embodiment of the invention.

For example, the ROM groove 75 could be implemented along the entire track of ROM pits and lands by splitting the write beam 13, 13' into two beams impinging on the active surface 43 of the hybrid disc master 1 while the latter is spinning. Alternatively, the groove-writing beam could be activated only during land periods (i.e., from the end of the trailing region decline of one pit-writing pulse until the initiation of the leading edge of the next pit-writing pulse). Also, if desired, the groove-writing pulse could be selectively activated and de-activated at any times and for any durations during the pit writing process, as conditions and preferences might dictate. Unless the groove-writing beam is maintained in an "on" condition during the entire process of writing a track of pits (or portion of a track), some means must be provided to activate the groove-writing beam in coordination with the pit-writing beam. As shown in FIGS. 13–15, as discussed below, this could easily be done by providing an output from the optical modulator signal 10 or from the laser drive signal 10' to control an optical modulator in the path of the groove-writing beam, with suitable, conventional circuitry to synchronize activation of the two beams.

Figure 10:
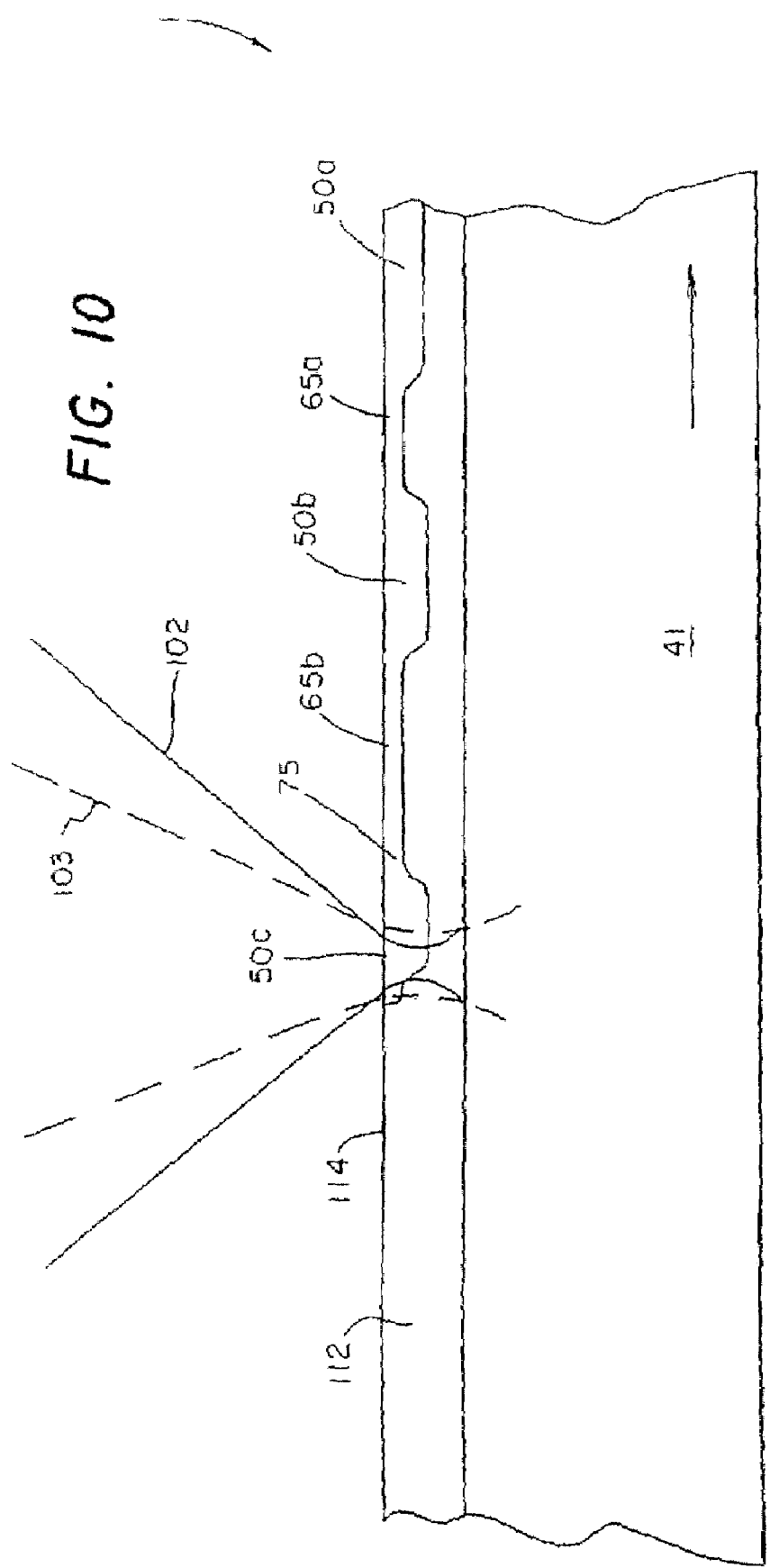
FIG. 10 is longitudinally sectional view of a small portion of a hybrid disc master or clear replica hybrid disc ROM area according to an embodiment of the invention with groove and pit forming beams superimposed while recording the hybrid disc master.

FIG. 10 illustrates the situation, in the hybrid disc master, where the principal ROM pit writing beam 102 and the ROM groove writing beam 103 are superimposed, so that the data marks are created simultaneously with the groove within which they are contained. In the tangentially-sectional view shown in FIG. 10, it can be seen that a succession of pits 50a,b,c and intervening lands 65a,b are formed within the optically-active layer 112 supported by the substrate 41 of the disc 1. Here, the pits are entirely within the formed groove 75, i.e., the upper surfaces of the pits are within the groove and are below its upper surface 114 (the unrecorded surface of the disc). In the embodiment shown in FIG. 10, the land portions 65a,b of the data track are likewise contained within the groove.

In the embodiment illustrated in FIG. 10, the groove-writing beam is "on" during the entire recording process. Once again, the groove-writing beam might selectively be activated only during the period between formation of successive pits, to form only grooved land areas 65 along the data track. This would have no effect on the HF or tracking of the pits, but tracking between pits, i.e., in the land areas, would be improved for the reasons discussed above. Alternative embodiments might involve selective formation of the groove by correspondingly controlled input to the means by which the groove-writing beam is created, as will be discussed below.

Figure 11:
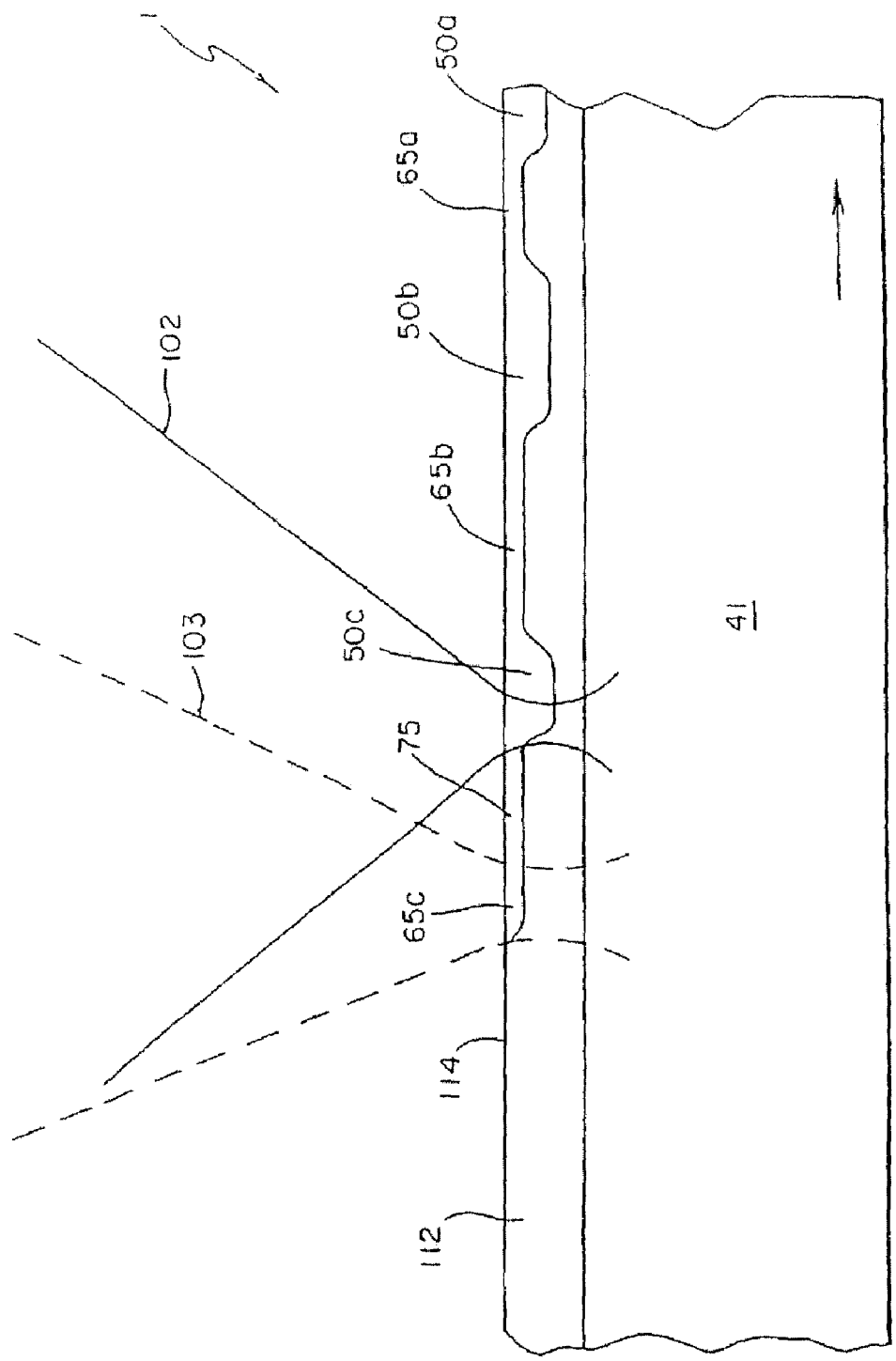
FIG. 11 is a longitudinally sectional view of a small portion of a hybrid disc master or clear replica hybrid disc ROM area according to an embodiment of the invention wherein the groove-forming beam leads the pit-forming beam while recording the hybrid disc master.

FIG. 11 differs from FIG. 10 only in that in FIG. 11, the groove-writing beam 103 leads the principal writing beam 102. This configuration shown in FIG. 11 presently appears to provide the best results in hybrid disc mastering according to the present invention. In all other respects, this embodiment is similar to that illustrated in FIG. 10, and all comments in reference to FIG. 10 apply equally to FIG. 11.

Figure 12:
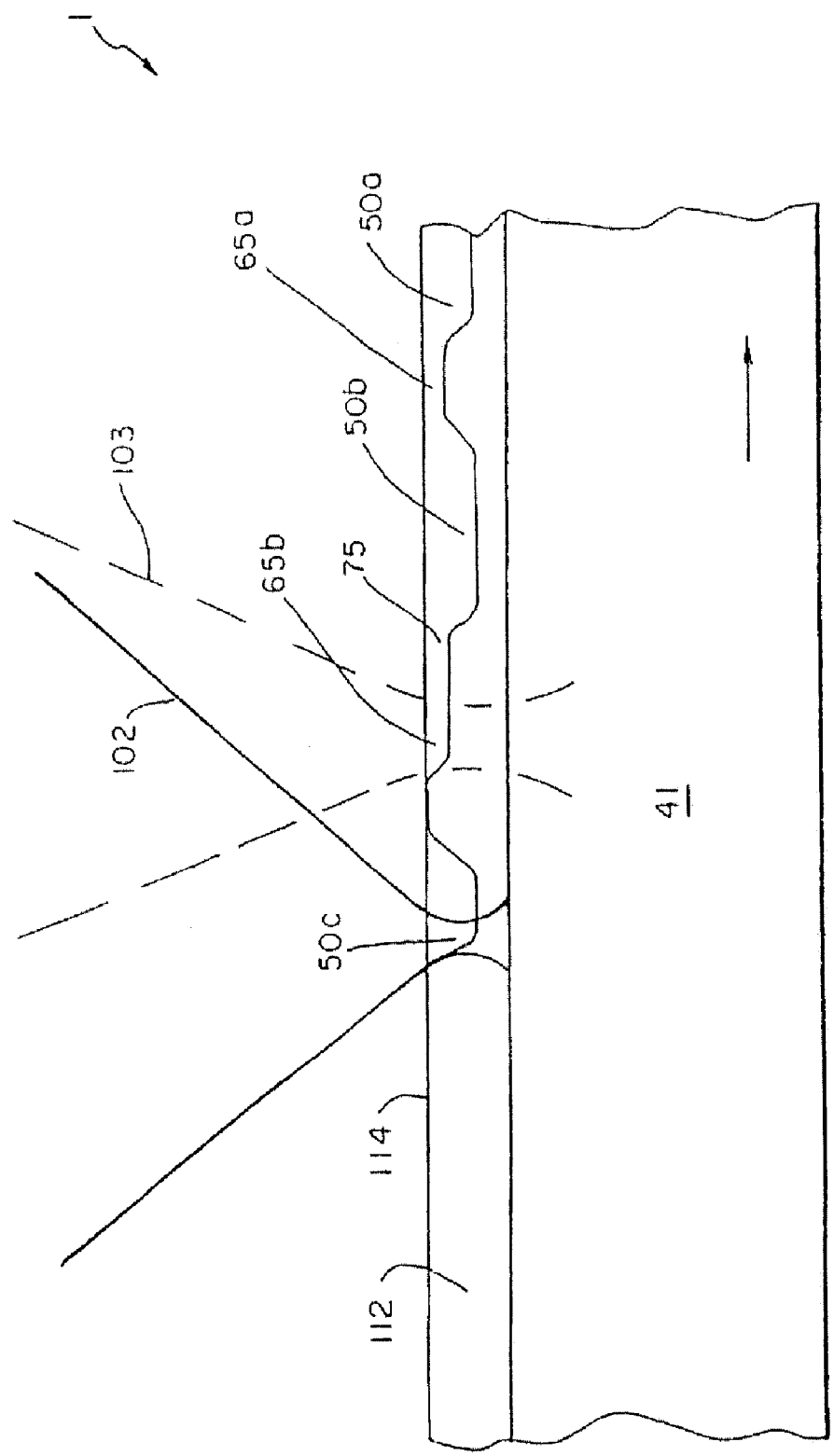
FIG. 12 is a longitudinally sectional view of a small portion of a hybrid disc master or clear replica hybrid disc ROM area according to an embodiment of the invention wherein the groove-forming beam lags the pit-forming beam while recording the hybrid disc master.

FIG. 12 illustrates the situation where the principal writing beam leads the groove-writing beam. It will be seen that here the pits are formed prior to formation of the groove in which they will eventually reside. The effect of the later-formed groove is to uniformly expel further material from the formed pits, without significantly changing their configurations. It is as if the already formed pits are pushed down into the newly formed groove, while maintaining their respective configurations.

All comments in respect to FIGS. 10 and 11 (except that the configuration shown in FIG. 11 presently appears to yield better hybrid disc results) apply correspondingly to FIG. 12, and it will be understood, in this and every succeeding context, that the identical methods can be employed in generation of hybrid disc master R band pre-grooves, as well. In respect to the latter, in the embodiment illustrated in FIG. 12, the initially-formed groove, created by principal beam 102, would be deepened, i.e., caused to occupy a position in the optically-active layer 112 further below its upper surface 114, by the succeeding effect of the groove-writing beam 103, without significantly changing its transverse sectional shape.

Various apparatus in which these beams may be formed and utilized will now be discussed.

FIG. 13 illustrates the principal embodiment of the invention, corresponding, in its utilization of a gas laser and external optical modulation, to the apparatus shown in FIG. 1 for hybrid disc mastering. Here the output beam from the write laser 7 enters a beam splitter 100, by which it is divided into two beams 120 and 121, respectively. Beam 120 is the principal writing beam and beam 121 is the secondary beam, the former being the source of the data writing beam 102, while latter is the source of the groove-writing beam 103. The principal beam 120 can be used for creating the ROM pits and can also create the principal component of the R band grooves (or the R band grooves, if no secondary beam is used to alter their transverse section configuration, as mentioned above). One input to the beam splitter 100 is a signal 104 defining the desired intensity ratio of the two resultant beams. Such beam splitters are well known in the art, and might, for example, be based on (1) half-wave plates in combination with a polarizing beam splitter; (2) an acousto optic deflector ("AOD"); or (3) an electro optic retarder in combination with a polarizing beam splitter. In the preferred embodiment, employing an AOD beam splitter, another input, not shown, establishes the deflection angle, which results in the desired radial separation, if any, of the two resultant beams at the hybrid disc master surface.

The principal beam 120 enters an optical modulator 11, whose action is controlled by the waveform shaping circuit 31 described above in the context of FIG. 1, and whose effect is also described in that context. It will be noted that in FIG. 13 an additional input to the waveform shaping circuit—Format—is shown. The latter is merely the input induced by the particular operation in which the apparatus is employed, whether it be data mark formation or cutting of a continuous or discontinuous groove or some other application to which the invention might be applied by those with ordinary skill in the art. The nature of the input and the waveform shaping circuitry to process it would be dictated by the particular application, in a manner well within the capability of a circuit designer of ordinary skill, based on these teachings.

One output from the waveform shaping circuit 31 is a signal 131 directed to the beam splitter 100 to control the extent and timing of the beam splitting operation. In some applications, beam splitting will occur substantially continuously. In others, it will be desired to intermittently divide the input beam into the two emergent beams. This action could be controlled by the waveform shaping circuit 31, as shown, or by some other input to the beam splitter or by an input to the source of the intensity ratio input to the beam splitter 100. Since the purpose of this input is clear, it is assumed that the ordinary practitioner could easily devise other means to accomplish it.

Figure 20:
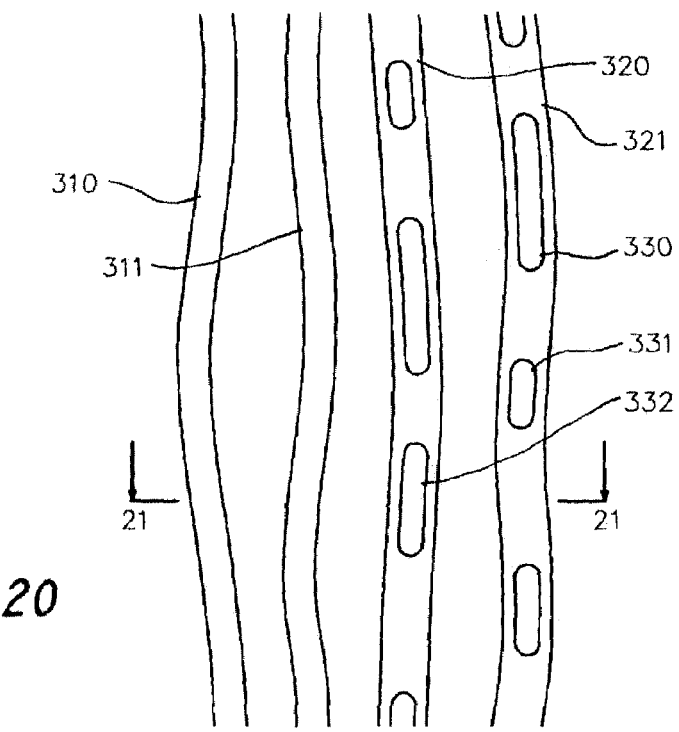
FIG. 20 is a plan view of a small portion of the hybrid disc master or clear replica hybrid disc of FIG. 19, showing a transition between an R band and an adjacent ROM band.

The modulated principal beam 122, after emerging from the optical modulator 11, passes through the principal ATIP deflector 150, controlled by ATIP input 151, which introduces the required ATIP modulation into the beam, in a conventional manner (see, also, the discussion in respect to FIGS. 14 and 20, below). The secondary beam 121 may be directed to another optical modulator 123, also controlled by the waveform shaping circuit 31, through line 133. Where the secondary beam is intended to create only a wide, shallow groove, either in the ROM or R band areas, the only secondary beam modulation normally required would be intensity and on-off control (both provided by the beam splitter 100) and spot size control (provided by the inverted telescope 130, see below). In that case, no optical modulator 123 would be required or it would be switched off. However, in some formats, further modulation of the secondary beam might be necessary or desirable, hence the provision of this optional secondary optical modulator 123.

After emerging from the optical modulator 123, the secondary beam 124 is likewise subjected to ATIP modulation by passage through the secondary ATIP deflector 155, controlled by ATIP input 156. The modulated beam 124, after passage through the secondary ATIP deflector 155, is directed to an inverted telescope 130, whose purpose is to reduce the diameter of that beam by a desired amount, according to the beam width ratio input over line 132, to generate an output beam 125. The effect of the inverted telescope 130 is to cause the spot size of the secondary beam, at the master disc surface, ultimately to be selectively greater than that of the principal beam.

It should be noted that in the principal embodiment shown in FIG. 13, wherein a gas laser is employed to create the "raw" write beam, and modulation is external to the laser itself, secondary ATIP deflector 155 can be incorporated into the beam splitter 100, if the latter is implemented as an "AOD" (acousto-optical deflector). In that case, the ATIP input 156 would, instead, constitute an input to the beam splitter 100, and this input would, together with the ordinary deflection input, cause the emergent secondary beam 121 to display both the desired radial displacement and ATIP wobble. Since the principal beam 120, i.e., the "zeroth order" beam, has not been subjected to any deflection in the beam splitter, it likewise would not, in this case, receive the ATIP modulation. Accordingly, the principal beam would still require separate ATIP modulation, necessitating passage through ATIP modulator 150, as in the previous case.

The primary beam 122 and the output beam 125 are combined in a beam combiner 135, whose purpose is to align the two beams for further processing. The beam combiner is entirely conventional, and might comprise a dielectric beam-splitter. Alternatively, a half-silvered mirror set at an appropriate angle (approximately 45°) might be used.

The two emergent beams are passed through a condenser lens 140, which expands the groove-writing beam 103 (derived from the secondary beam 125) and the data beam 102 (derived from the primary beam 122) and directs both beams to the objective lens 145. It will be recalled that the inverted telescope 130 has narrowed the modulated beam 124 to generate the output beam 125 directed to the condenser lens 140. Because of this narrowing, the resultant groove-writing beam 103 does not completely fill the input pupil of the objective lens, effectively reducing its NA, with the result that the latter will not be focused into as small a spot as will the data beam 102, which fills the objective lens. Thus, the relative diameters of the two beams at the disc surface 43 will result in formation of a groove 75 whose width is greater than that of the pits 50, as shown in FIG. 6, as the disc 1 is spun by its spindle motor 3, the latter governed by a suitable speed control 5 to ensure constant linear velocity.

Of course, the actual dimensions of the two final beams will depend on the parameters governing their upstream processing, notably in proper selection of the reduction factor of the inverted telescope 130 and the parameters of the two lenses 140,145. Likewise, all or a selective portion of the required optics will be supported by an apparatus (not shown) similar in function and purpose to the carriage 21 shown in FIGS. 1 and 2—or some other means for relative radial motion between the beams and the disc axis will be provided, as discussed above—to ensure that the data track is properly positioned on the disc. But these expedients are certainly within the skill of the ordinary practitioner, based on the teachings herein and in the pertinent art.

FIG. 14 illustrates the same configuration of the invention as shown in FIG. 13, but in reference to the apparatus shown in FIG. 2, wherein a diode laser is employed. The comments made in reference to FIG. 13 apply equally to the embodiment shown in FIG. 14, except, of course, those made in respect to the optical modulators shown in FIG. 13. Like FIGS. 13 and 15, groove-writing beam 103 is focused at the active surface 43 of the disc 1. However, due to the smaller NA of the groove-writing beam, its spot size is larger than that of the principal beam 102, in order to produce a groove of desired width exceeding that of the data pits. In hybrid CD applications, with a pit width of ≈0.5 micron, the spot size of the groove-writing beam at the disc surface might be ≈1–2 microns. During recording of the R band pre-groove the waveform shaping circuit is switched off, since the pre-groove is principally created with a constant-intensity beam).

In the embodiment shown in FIG. 14, a first optical deflector 150 is interposed in the path of the principal beam 122. Its purpose is to selectively oscillate the beam, by action of the input through line 151, to produce a wobbled principal emergent beam 162, which will result in the track-writing beam 102. That ATIP input will, in a manner well-understood by those familiar with CD-R mastering, include all the parameters for a correct wobble to be introduced into the ROM data tracks and R band pre-groove tracks, as discussed above. A second optical deflector 155, likewise controlled by the same ATIP input signal (over line 156), similarly induces the desired wobble into the beam 124. That will produce output beam 161, which will, upon passage through the inverted telescope 130, result in the secondary emergent beam 163, which will, in turn, result in the groove-writing beam 103. Preferably, optical deflectors 150,155 are both AODs. Of course, both deflections must be carefully synchronized and weighted, and this is best accomplished if the ATIP wobble signal to optical deflectors 150,155 comes from a single source, as suggested above.

It will be understood, by those with ordinary skill in the art, based on the present teachings, that the intensity of a groove-writing beam may be varied to cause the depth of the resulting groove to be correspondingly varied. This variation in beam intensity can, for example, be readily accomplished by selective control of the intensity level of the output beam 161 directed to the inverted telescope 130, from which emerges the secondary emergent beam 163. This is done by selecting the laser power and the intensity ratio input to the beam splitter 100. In any event, the ultimate intensity of the groove-writing beam can readily be selected to provide an effect, in the active layer, which varies from production of a full-depth groove, as above described, to merely a berm-removal expedient. The latter would require beam intensity sufficient to produce, in the moving, active layer 43, a level of heat generation only slightly above its thermal threshold, while the former would require a suitably greater intensity. These adjustments, to produce any desired result, would be well within the ability of the ordinary practitioner, based on the teachings herein.

Those familiar with dye-polymer optical data recording will observe that, all else being equal, the groove that would be created by the groove-writing beam would tend to have a curved base, when viewed in section transverse to the track axis. This is because, like the principal pit-writing beam, the intensity cross-section of the essentially circular beam would approximate an Airy Disc distribution along its diameter, with the greatest intensity nearest its center. In some applications, however, a more flat-bottomed groove, as shown in FIG. 8, might be desirable, particularly as this might improve tracking by providing, in the final hybrid disc, a uniformly λ/8 phase depth along the base of the groove.

FIG. 15 illustrates an apparatus for generating such a relatively flat-bottomed groove by causing the groove-writing beam to dither (i.e., rapidly oscillate transversely to the axis of the track of pits) during relative motion of the groove- and pit-writing beams along the track. It will be noted that FIG. 15 is directed toward the configuration shown in FIG. 13, in turn relating to the apparatus shown in FIG. 1, employing a gas laser requiring external optical modulation. It is assumed that a practitioner of ordinary skill could easily adapt its teachings to the apparatus shown in FIG. 2 (i.e., to the embodiment shown in FIG. 14), wherein a diode laser is employed, based on the teachings herein and principles well known in the art.

FIG. 15 is actually a dual-mode apparatus, which can be utilized either for CD or hybrid disc mastering. In the CD mastering mode, the ATIP signals over lines 151,256 are de-activated, since CD mastering requires no wobble creation. In the R band pre-grove creation phase of hybrid disc mastering, the ATIP signals are activated, but the optical modulators 11,123 merely transmit beams of selected constant intensity during all or any portion(s) of the track-forming process. Whichever the case, the input to the optical deflector 155 over line 260 derives from an ordinary signal combiner 220, whose input is whichever of those signals might be activated at the time.

All elements shown in FIG. 15 have already been discussed, and the only material difference between the embodiments shown in FIGS. 14 and 15 (other than the imposition of external optical modulators 11 and 123 in FIG. 15, a gas laser embodiment) is the additional dither input to the optical deflector 155 over line 231. In the hybrid CD mastering mode, the dither input causes the optical deflector to execute a complex oscillation of the secondary beam 124, which is a combination of the relatively slow ATIP wobble and the faster dither. This dither input may be provided by a conventional oscillator circuit, synchronized with an output from the waveform shaping circuit 31, in a manner well within the capacity of an ordinary practitioner.

The output from the beam combiner 135 consists of two superimposed beams that pass through the condenser lens 140 and on to the objective lens 145. Emerging from the objective lens are two beams 191,192. Beam 191 (shown in solid line) is the un-dithered beam, which is focused onto the active surface 43 of the disc 1 at point 193. The other beam 192 (shown in dotted line) is the dithered beam, which is focused instantaneously at point 194. However, since beam 192 is dithered, its point of focus moves rapidly in a radial direction (relative to the disc—i.e., up and down in FIG. 15), crossing and re-crossing the focal point 193 of the undithered beam 191, reaching point 194', for example. It will be understood by those with ordinary skill in the art that the extreme radial movement of the focal point of dithered beam 192, to either side of the focal point of beam 191, is only of the order of a micron, and that FIG. 15 necessarily greatly magnifies this range of movement for clarity.

A relatively flat-bottomed groove may be created by substituting a diffraction grating (or other ordinary diffractive element, such as a phase grating) for the inverted telescope shown in FIGS. 13–15. The grating converts the groove-writing beam 124 from the beam splitter 100 into two images, mutually displaced slightly, which together constitute a single, broadened laser beam impinging on the optically active surface.

Figure 16:
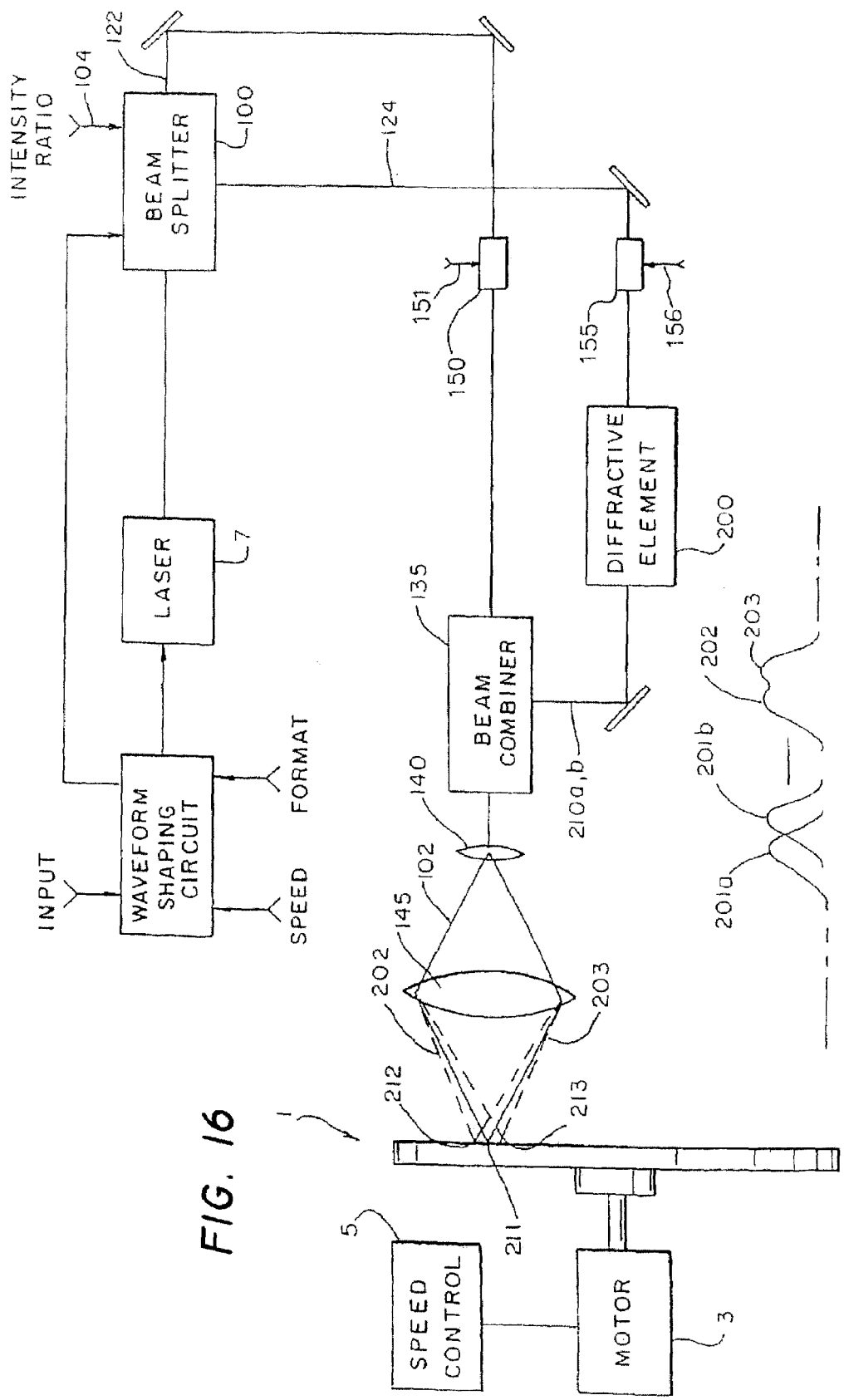
FIG. 16 is a generalized block diagram illustrating the embodiment of the invention shown in FIG. 15, but with an alternative means to create beam spread.

This embodiment is illustrated in FIG. 16, which is based on FIG. 14 (a diode laser embodiment) and in which the relative focal positions of the beams are greatly separated for clarity. The diode laser embodiment is chosen for simplicity in presentation, it being understood that a gas laser embodiment with external optical modulators could alternatively have formed the basis for FIG. 16, since the nature of the beam source is unimportant in the context of this invention.

Referring now to FIG. 16, the groove-writing beam 124 emerges from the beam splitter 100 and passes through an optical device 200, which, in the preferred embodiment, is a custom-designed diffractive element. Its purpose is to divide the incident beam into a pair of emergent beams 201a,b that are mutually offset slightly. Those with ordinary skill in the art will readily be able to substitute alternative optical devices to accomplish this purpose. As shown in the inset to FIG. 16, because these emergent beams each have an approximately Gaussian intensity cross-section, that small mutual displacement results in a joint beam whose intensity profile (in a sectional plot along the displacement axis) is nearly rectangular, as shown.

The emergent, slightly displaced, beams 201a,b are combined with the principal beam 122 in the beam combiner 135, the output of which is passed through the condenser lens 140 and thence through the objective lens 145. Three beams, 102, 202 and 203 are thus focused onto the active surface 43 of the spinning disc 1. Beam 102 is the principal write beam, while beams 202 and 203 are, together, the groove-writing beam. These three beams focus, respectively, at points 211, 212 and 213 on the active surface. It will readily be appreciated that FIG. 16 is drawn out of scale to show detail, where in fact beams 202 and 203 would overlap at the active surface, as shown in the inset and beam 102 would focus in the center of that merger. The result, at the surface, if seen microscopically in plan view, extending radially, would be an elliptical light spot whose intensity is greater at the center (where the pit is written) than at either side (by which the groove is created).

Figure 17:
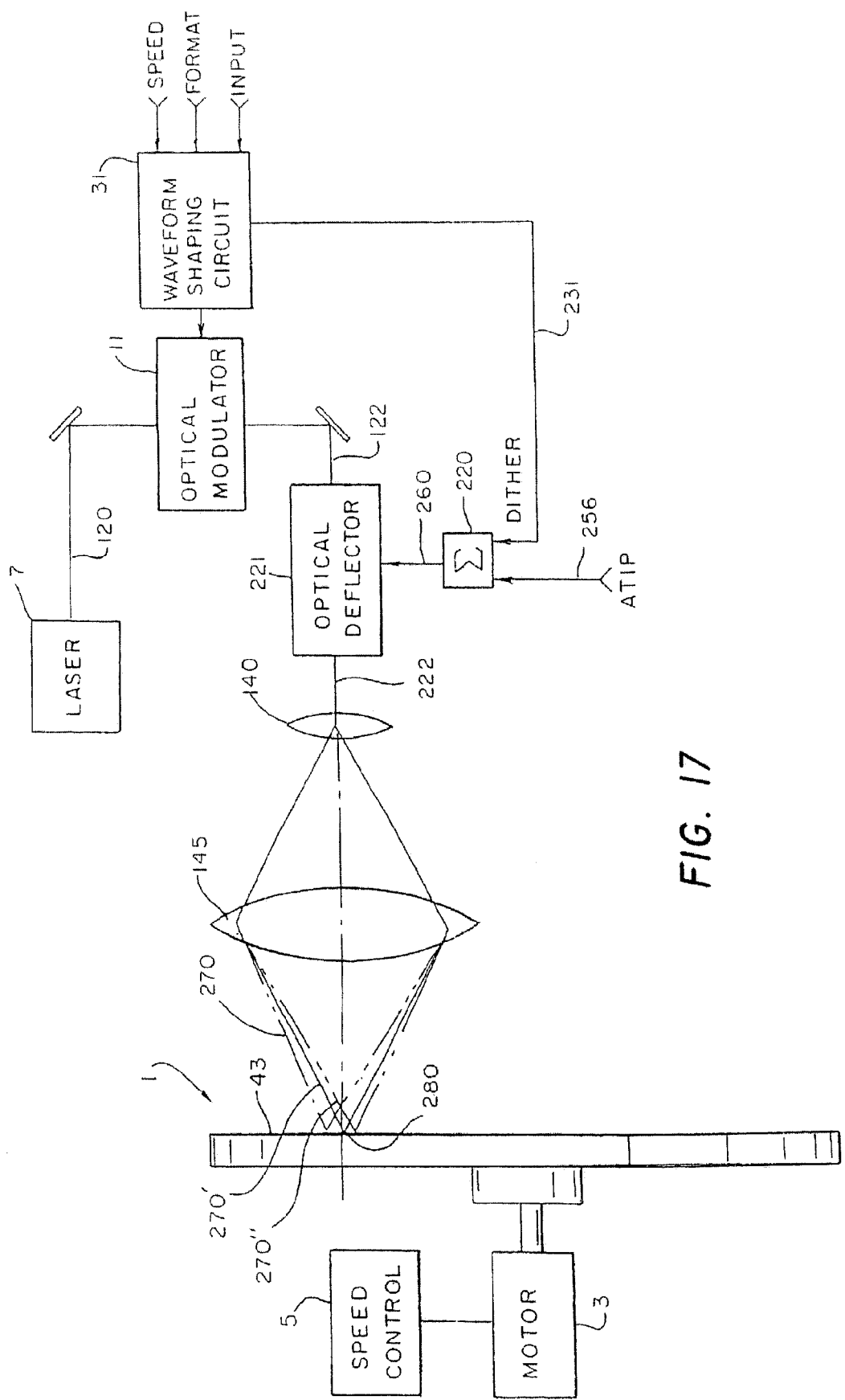
FIG. 17 is a generalized block diagram illustrating an embodiment of the invention illustrating another means to create beam spread.
Figure 18:
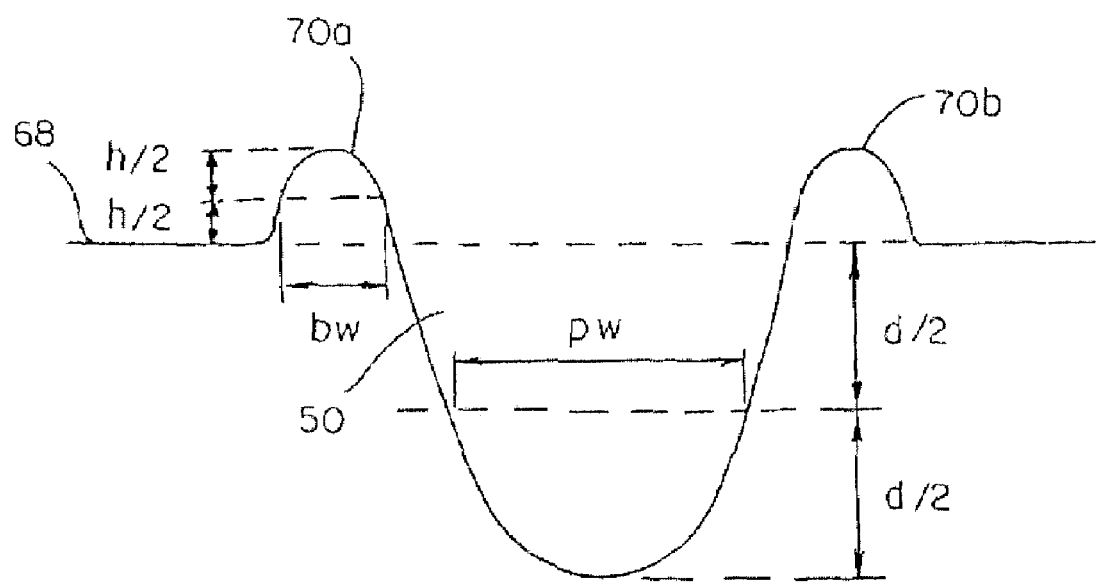
FIG. 18 is a transversely sectional view of a generalized ROM data pit, illustrating various dimensions.

The embodiment shown in FIG. 16 is based on separation of pit-writing and groove-writing beams, 122 and 124, respectively, by means of the beam splitter 100. However, a similar result can be achieved by use of a single beam, as illustrated in FIG. 17.

Here, as in the case of the embodiment illustrated in FIG. 13, the laser 7 emits a beam 120 directed through an optical modulator 11, which is controlled by a waveform shaping circuit 31 whose inputs may include rotational speed, format and data input signals. The output beam 122 from the optical modulator is directed to an optical deflector 221, completely similar to the optical deflector 150 shown in FIG. 14 and described in that context. Its purpose is also similar: to convert beam 122 into an output beam 222 that is selectively dithered in a radial direction relative to the disc (i.e., up and down, in respect to FIG. 17). This selective dither is caused by a dither output signal 231 from the waveform shaping circuit, whose instantaneous amplitude is exactly synchronized with the instantaneous amplitude of the beam 122 emerging from the optical modulator. The dither signal is summed with an ATIP input by means of a conventional electronic summing device 220, the output of which constitutes the input 260 to the optical deflector. The deflected beam 222 passes through the condenser lens 140 and the objective lens 145, to emerge as the focused beam 270 impinging upon the active surface 43 of the disc 1 at moving point 280. This beam (shown as beam 270, 270' and 270" to indicate motion) traces a complex radial dithering pattern on the disc surface as it rotates, creating the desired features (pits, groove, etc.).

Because the dither signal is generated by the same waveform shaping circuit 31 that controls the optical modulator, the input to the waveform shaping circuit will ultimately determine simultaneously the instantaneous intensity and radial position of focused spot from the write beam 270 on the active surface 43, as the disc 1 continually spins. Accordingly, by generating a proper input signal to the waveform shaping circuit—which is well within the capability of the ordinary practitioner, based on the teachings herein, in the references cited and in the literature—an extremely complex trace can be recorded spirally in the active surface of the spinning disc, which can be translated into thousands of reproductions if a stamper is made from the master disc thus created.

For example, this technique might be applied simply to form more precise ROM pits the hybrid disc master. Here, the beam is narrowly focused to a relatively minute spot, by proper selection of optical parameters and write beam wavelength. While the disc spins, that tiny spot is dithered very rapidly within a range (in a radial direction relative to the disc) corresponding to the width of each pit to be written in the data track. That dithering range changes precisely as the desired width of each pit changes along its length, as it is being written. Between pits in the track, the optical modulator extinguishes the beam until the commencement of the next pit. In a dye-polymer medium, thermal smearing assures that the resultant pits are properly configured in plan and sectional view. But because of the rapid, precisely controlled dither of a relatively minute beam, the resultant pits may be more precisely formed than in the case of a simple write beam following the data track.

In a second example, a track of ROM data pits could be formed within a continuous groove in the hybrid disc master. Here, a second dither signal is superimposed upon (i.e., summed with) the pit-forming dither signal, where the second signal creates the groove in which the sequence of pits and lands will reside on the disc. The groove depth is determined by the beam intensity increment corresponding to groove formation (which would typically be caused to generate an incremental heat influx only slightly above the thermal threshold of the moving medium), and its width is determined by the range of this secondary dither. As mentioned above, by properly controlling the amplitude of the secondary dither, berms could be removed without creation of any substantial groove at all.

As a third example, a track of ROM pits could be formed in the manner described above, with a groove for tracking purposes created only between pits. Here, superimposed upon the pit-forming signal is a groove-forming signal as described in the previous example. However, in this example the groove-forming dither signal is activated only when the pit-forming dither signal is quenched, with perhaps a slight overlap to facilitate tracking, but timed and shaped so as not to obscure pit/land transitions and thus impair HF detection.

In the R bands of the hybrid disc master, the continuous pre-groove is created by providing a single dither signal of constant dithering range and suitable intensity, upon which an ATIP wobble signal is superimposed. As mentioned above, this mode would be activated by programmed switching means, well within the capacity of one having ordinary skill in the art.

In all these examples and modes, the dithering range and instantaneous beam amplitude may be controlled by conventional means to produce virtually any ROM pit or R band pre-groove geometries desired. Furthermore, application of the dithering embodiment of the present invention might be expanded by one with ordinary skill in the art, based on these teachings and those in the relevant literature, to improve PR mastering techniques by precisely controlling the three-dimensional extent of photoresist exposure. The latter techniques might also be applied to eliminate some of the inherent roughness characteristic of the PR process and/or to reduce or possibly even to eliminate slope discontinuities in the transverse sectional shape of resulting pits.

For efficiency in describing several embodiments of the invention, FIGS. 13, 15 and 17 have been based on the use of a gas laser, as the write beam, while FIGS. 14 and 16 have been based on the use of a diode laser. As mentioned above, gas lasers require external modulation, whereas in diode laser implementations the laser itself acts as the summing element for the various input signals combining to produce the desired write beam intensity profile. Of course, each of these embodiments could have been shown, with an equal number of additional figures, in both a gas laser and diode laser implementation. However, it is believed that sufficient disclosure has been provided to enable one of ordinary skill in the art to implement all these embodiments, and many others within the scope of this invention, in either a gas or diode implementation by providing appropriate circuitry, based on the information provided herein.

While the choice of implementation, whether featuring use of a gas or diode laser, is a design choice left to the practitioner, there is at least one significant difference. Since gas laser implementations require external modulation, each beam split from the laser beam may thus be separately modulated. Therefore, based on the embodiment shown in FIG. 13, for example, a write timing differential could be implemented between the data-writing beam 102 and the groove-writing beam 103, by providing conventional beam deflection means, such as a mirror, to cause one of the two beams selectively to focus at a different position along the data track than the other. The beams could thus be caused to coincide, as shown in FIG. 10, or one could be caused to lead the other, as shown in FIGS. 11 and 12. If a diode laser were used as the writing beam source, as shown, for example, in FIG. 14, it would be more difficult to accomplish this, without at least providing a coordinated pair of separately modulated lasers or an external modulator for each one.

Once again, the goals of the present invention are implemented, at least to some extent, by removal (or substantial reduction) of the berms normally generated in the dye-polymer process. With the exception of U.S. Pat. No. 5,741,627 (Cubit, et al.) and U.S. Pat. No. 6,022,604 (Del Mar, et al.), which address the berm problem in an entirely different manner than taught herein, the published literature does not appear to contain substantial reference to these berms, which tend to result naturally in the process of formation of three-dimensional features in optical recording media by thermal recording processes, such as the dye-polymer process.

Despite this dearth of literature reference to berm formation in thermal recording processes, those with ordinary skill in the art will, upon consideration of the teachings herein, appreciate that a reduction of berm height would improve HF detection, and will particularly appreciate the great improvement realized if these berms can be virtually eliminated.

We have found that, by employing the techniques of the present invention, as disclosed herein, these berms may be reduced to the point where detection of their vertical departure from an index level becomes quite difficult. In other words, by applying the techniques herein taught, and by "tweaking" the various available parameter settings in a manner familiar to those of ordinary skill in the CD mastering and manufacturing art (in the manner described above and below), a practitioner can expect to be able to create a hybrid disc master by a thermal recording process from which can be replicated clear replica hybrid discs whose three-dimensional features, such as ROM data pits and R band pre-grooves, are virtually devoid of berms.

Measuring berm height (h, in FIG. 7) and pit depth (d, in FIG. 7) as opposing vertical distances from an index level (which is defined as the vertical position from which the berm begins to rise at one of its radial extremities: e.g., 177, in FIG. 7), we have found that application of prior thermal recording techniques, e.g., based on the dye-polymer method, apart from the present teachings, in CD-ROM mastering results in berm formation in which the ratio of berm height to pit depth (i.e., h/d) is at least 20%, and typically greater. By carefully applying prior art methods according with published teachings, we have not been able to achieve such a ratio of less than about 20% in that format. We have observed that, with the thicker dye-polymer layer used in hybrid CD mastering in order to generate deeper ROM pits (because a layer of dye will be spin coated over the clear replica hybrid disc to produce the final hybrid disc), a lower ratio is readily achievable. But this is not because the berms, themselves, are lower. Rather, it is because the deeper hybrid disc master ROM pits, when compared with the same berm height, naturally yield a lower ratio.

However, since hybrid disc mastering and manufacture entails a greater number of variables than ordinary CD-ROM mastering, it is very desirable, in this context, to achieve the highest Figure of Merit possible. Therefore, the berm height ratios achieved by prior art CD-ROM mastering methods, even if translated into the expected results in the hybrid disc context, will not produce a sufficiently high Figure of Merit. Accordingly, the techniques taught herein, which are capable of further drastic reduction of berm height ratio, are necessary to achieve an optimal result.

Of course, optical data recordings by the PR method typically display no berms at all, because that process is not a thermal process and no material expulsion takes place in formation of three-dimensional marks by that method. Although thermal processes, e.g., the dye-polymer process, inherently tend to promote berm formation, which is alleviated by the foregoing embodiments of the invention, the fact that these processes also tend, unlike the PR method, to produce smoothly surfaced pits of continuous slope is advantageous, if well controlled.

While we have observed that the bonding structure of the polymer utilized in forming the dye-polymer disc master recording layer has a profound effect on the extent to which berms will be generated in the optical data mastering process, in connection with CD and DVD mastering, we have not observed that these steps are particularly valuable in hybrid disc mastering. However, reference is nevertheless made to the Parent application for a full discussion of this topic.

Of course, the write and read beams utilized in hybrid disc mastering by the disclosed methods can originate with other than laser sources. For example, electron beams or ion beams could be thus employed. And there will undoubtedly be other beam sources applicable to the present invention, some of which may await future scientific development for their realization. But any and all of these laser alternatives would likewise fall within the scope of the present invention, and their implementation by necessarily altered apparatus and/or methods, well within the ability of those having ordinary skill in dealing with such alternative energy sources, would likely constitute no more than the equivalent of the invention as claimed.

As is well known in the art of CD manufacturing and briefly discussed above, a stamper is made from the disc master (in this case the hybrid disc master) by applying a very thin metal coating to the master (by sputtering or vapor deposition), and then building up that coating by galvanic nickel plating. The resulting metal stamper is then removed from the master, which is discarded. The stamper constitutes the die from which the replica discs (here, the clear replica hybrid discs) are injection molded at elevated temperatures and high pressures. Following this, a suitable dye, as described in the CD-R literature, is spin coated over each clear replica and cured in a conventional manner. As in the case of CD-R manufacturing, the dye layer is then coated with a thin reflective layer over which a protective layer is applied, to produce the final hybrid disc.

Dye manufacturers, such as Ciba (see, above) often include, in their product brochures and instruction materials, very specific and detailed instructions as to how the spin coating process (using their particular dyes) should be conducted. The practitioner is referred to these dye manufacturer process specifications for further information on spin coating and related topics.

Figure 19:
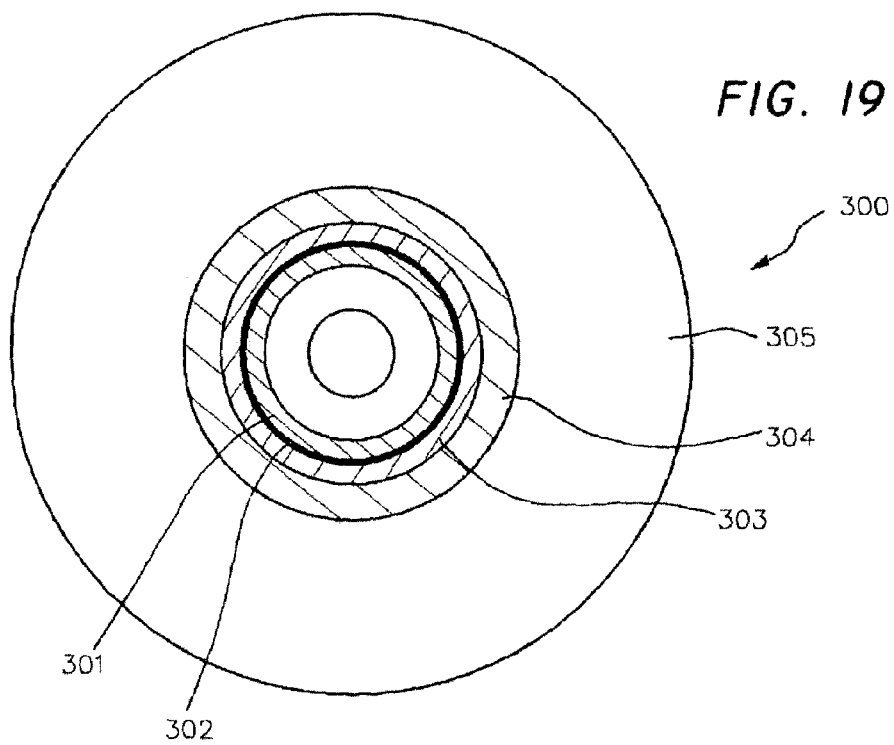
FIG. 19 is a plan view of a hybrid disc master or clear replica hybrid disc according to the invention.
Figure 21:
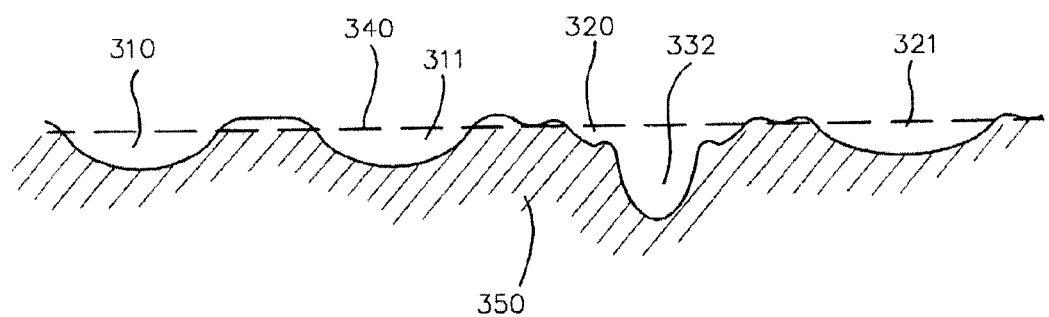
FIG. 21 is a transverse sectional view, through 21—21 of FIG. 20.
Figure 22:
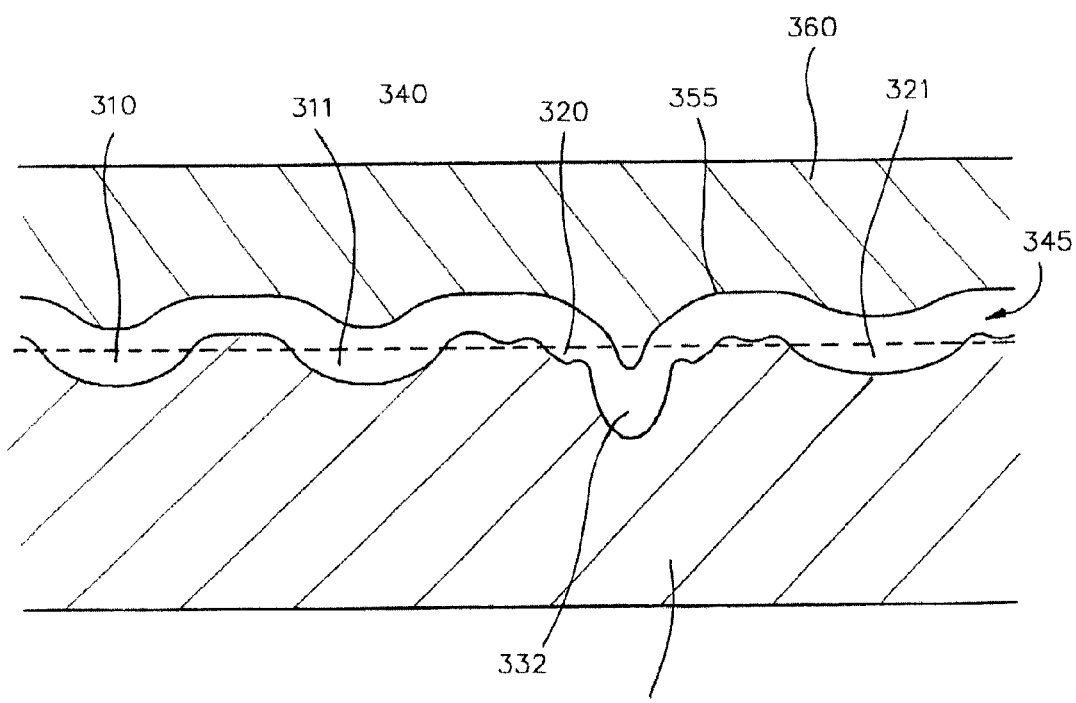
FIG. 22 is a transverse sectional view of a portion of a final hybrid disc, corresponding to the portion of the hybrid disc master or clear replica hybrid disc shown in FIG. 21.

The various preferred dimensional ranges in clear replica hybrid discs and final hybrid discs made according to the present invention, are tabulated below in reference to the FIGS. 19–23. FIG. 19 is a plan view of a hybrid disc 300 showing the five Orange Book mandated bands, discussed above. FIG. 20 displays, in schematic plan view (with ATIP wobbling amplitude and frequency exaggerated for clarity), a small portion of disc 300 at the transition between R band 303, with pre-grooves 310 and 311, and the adjacent ROM area 304, with ROM grooves 320 and 321 and ROM pits 330,331,332. FIG. 21 is a section through 21—21 of FIG. 20, showing the various features of disc 300 at this transition in transverse view. FIG. 22 assumes that the disc 300 is a clear replica hybrid disc, and thus indicates only the substrate 350 and the various three-dimensional features created in its upper region. FIG. 22 is similar to FIG. 21, except that here disc 300 is a final hybrid disc with the dye layer 345, reflective layer 355 and protective layer 360 also shown. As with all other Drawing figures, these features are not to scale.

FIG. 23a is substantially identical to FIG. 22, but expanded to more readily show the various dimensional parameters whose preferred ranges are given in Table 1, below. In FIG. 23a and Table 1:

$D_{RGroove}$ is the depth of pre-groove 311 as displayed in the clear replica, measured downward from the latter's surface (indicated by a dotted line);

$D_{RGD}$ is the depth of the residual groove 311' above the dye and reflective layer, resulting from conformity of the dye layer within pre-groove 311

$W_{RGroove}$ is the width of pre-groove 311, measured at half-depth, as indicated;

$D_{Pit}$ is the depth of ROM pit 332, measured downward from the pit initiation level 324 within the ROM groove 320 (indicated by a dotted line);

$W_{Pit}$ is the width of ROM pit 332, measured at half-depth from the pit initiation level 324, as indicated;

$D_{ROMgroove}$ is the depth of ROM groove 321 as displayed in the clear replica, measured downward from the effective land level 334 (indicated by a dotted line);

$D_{ROMGD}$ is the depth of the residual ROM groove 321' above the dye and reflective layer, resulting from conformity of the dye layer within ROM groove 321; and $W_{ROMGroove}$ is the width of ROM groove 321, measured at half-depth from the effective land level 334, as indicated.

TABLE 1

| Parameter | Preferred Range (nanometers) |
|---|---|
| $D_{RGroove}$ | 120–250 |
| $W_{RGroove}$ | 450–750 |
| $D_{Pit}$ | 250–450 |
| $W_{Pit}$ | 350–550 |

Figure 25:
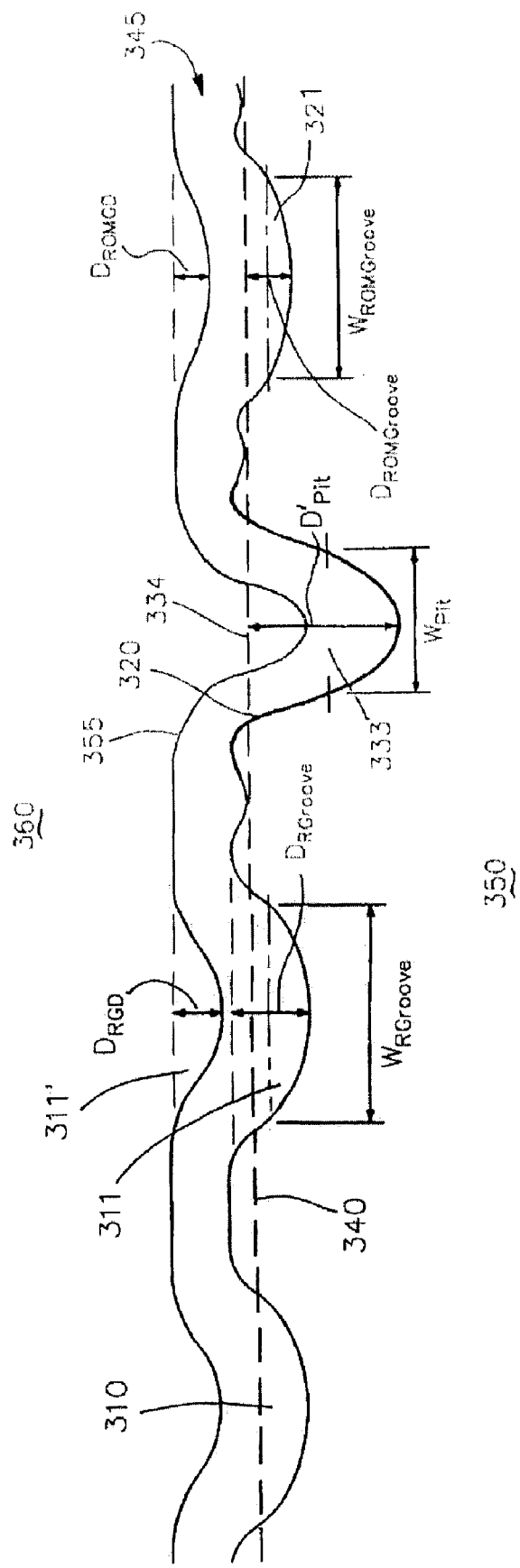
FIG. 25 is similar to FIGS. 23a and 23b, but shows a ROM pit within a ROM groove according generally to the examples shown in Table 3.

To avoid confusion, it should be borne in mind that, in reference to FIG. 23a and in the data given above, $D_{Pit}$ is measured from the pit initiation level 324 within the ROM groove 320, according to the convention followed in U.S. patent application Ser. No. 10/255,027 ("the '027 application"), whereas in FIGS. 23b and 25 and the data presented in Tables 2 and 3, as will be described below, $D'_{Pit}$ is measured from the effective land level 334, from which the ROM grooves descend. This apparent discrepancy is caused by the fact that when the ROM pit is nearly as wide as, or slightly wider than, the ROM groove in which it is created, as illustrated in FIG. 25, which generally represents the data shown in Table 3, the pit initiation level 324 and the effective land level 334 essentially coincide. Therefore, in order to differentiate between the above examples and those described below, and to better illustrate the claims appended hereto, the depth (i.e., "extent of the vertical dimension") of ROM pits will be designated $D'_{Pit}$, as thus defined, in the following tables and in FIGS. 23b and 25.

Another possible source of confusion might be the manner in which widths (i.e., the transverse dimensions) of the various features may be measured. As indicated above, the width of a pit or a ROM groove is typically measured at half depth of that feature, downward (or upward) from some vertical level. For example, referring to FIG. 23a, half depth 333 of ROM pit 332 is halfway down from the pit initiation level 324 to the base of the pit, and its width at half depth $W_{Pit}$ is measured transversely at that point. Similarly, half depth 323 of ROM groove 321 is halfway down from the effective land level 334 to the base of the groove and its width at half depth $W_{ROMGroove}$ is measured transversely at that point.

Alternatively, the transverse extent of a feature, is the distance from one side of the feature to the opposite side of the feature, including any displacement of the feature in the opposite vertical direction (e.g., caused by berms). For example, in FIG. 23a, the transverse extent of pit 332 is the transverse distance from one side 335a of the pit to the opposite side 335b of the pit, i.e., from where its contour arises from the pit initiation level 324 on one side to the point where it returns to that level on the opposite side. Similarly, the transverse extent of groove 321 is the transverse distance from one side 322a of the groove to the opposite side 322b of the groove, i.e., from where its contour arises from the effective land level 334 to the point where it returns to that level.

It should be noted that for a particular selected dye and replication conditions, the preferred dimensional ranges are significantly narrower than those shown in Table 1, in order to achieve best overall performance and Figure of Merit of the final hybrid CD. However, research performed subsequently to Sep. 25, 2002, the filing date of the '027 application, utilizing the materials and techniques taught in the '027 application, has shown that an even wider range of acceptable parametric values may thereby be realized. These are shown in Table 2:

TABLE 2

| Parameter | Acceptable Range (nanometers) |
| --- | --- |
| $D_{RGroove}$ | 50–250 |
| $W_{RGroove}$ | 450–750 |
| $D'_{Pit}$ | 250–500 |
| $W_{Pit}$ | 350–650 |

For example, we have recently found that overall performance and Figure of Merit of the final hybrid CDs replicated from hybrid disc masters with ROM groove and ROM pit dimensions as shown in the following three examples are not substantially compromised, even though their parametric values fall outside the earlier-investigated ranges. These data were generated utilizing Ciba Ultragreen MX dye according to the manufacturer's specifications, and otherwise following the teachings of the '027 application, and are identified in Table 3, below. It should be noted that these data were taken from stamper measurements. The feature dimensions on discs replicated from these stampers would perhaps be ~5% less. Depths were measured from the effective land level (shown as 334 in FIGS. 23 and 25). Widths were measured at half depth, as also shown in FIG. 25. These pit data are values from relatively long run length (e.g., ~9–11T) pits. It is anticipated that shorter pits would display somewhat smaller pit widths. In reference to the following Table 3, it should be noted that R groove and ROM groove dimensions are essentially identical in this and most other cases, since typically the R groove and ROM groove are, in fact, the same groove.

TABLE 3

| Parameter | Example 1 (nanometers) | Example 2 (nanometers) | Example 3 (nanometers) |
| --- | --- | --- | --- |
| $D'_{Pit}$ | 380 | 360 | 411 |
| $W_{Pit}$ | 521 | 526 | 557 |
| $D_{RGroove}$ | 118 | 75 | 165 |
| $W_{RGroove}$ | 507 | 488 | 528 |

Figure 24A:
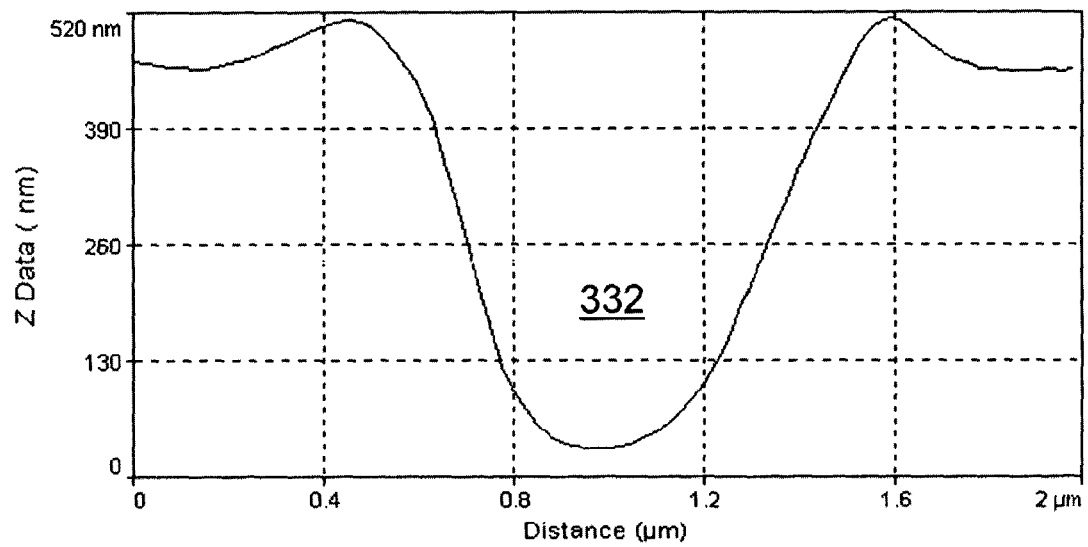
FIGS. 24a and 24b schematically illustrate, respectively, the transverse configurations of a ROM groove and a ROM pit generated according to the examples shown in Tables 2 and 3.
Figure 24B:
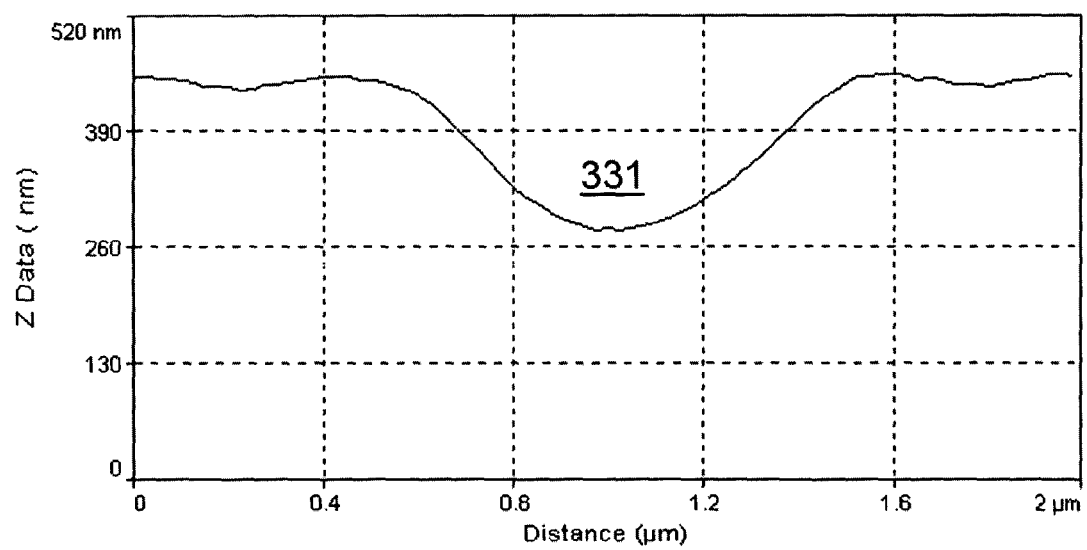

It will be noted that in these Examples, the width of the ROM pits, at half depth, actually exceeds the width of the ROM groove at half depth. In particular, in Example 2 the ROM pit width is 110% of the ROM groove width, although in none of these data did the actual transverse extent of the pits exceed the transverse extend of the corresponding grooves. These data were taken from a disc having a track pitch of 1.6 microns and a 650-megabyte total hybrid CD capacity. It is possible that with a track pitch of 1.5 microns, required for a full 700-megabyte hybrid disc capacity, crosstalk issues might arise if the ROM pits in that case were wider than the ROM grooves. However, these data do demonstrate that by adjusting the track pitch, it is possible to have ROM pits that are up to approximately 110% as wide as the ROM grooves in which they are created. This condition is shown in FIGS. 24a and 24b, which are, respectively, a simplified scan of such a ROM groove (FIG. 24a) and of such a ROM pit (FIG. 24b), similarly dimensioned. When such pits are generated within such grooves in the hybrid disc master, the result, when viewed in transverse section, appears to be merely a pit whose depth is increased by that of the groove in which it is generated. This is illustrated as pit 334 in FIG. 25.

Thus, the aforementioned recent research has shown that by use of the materials and techniques taught in the '027 application, the pits can actually be somewhat wider than the grooves without detrimental results in overall performance and Figure of Merit of the replicated hybrid CDs. This is the result of the great flexibility afforded by the methods taught there. However, we continue to believe that if the ROM pits are narrower than the ROM grooves in which they reside, this will present fewer cross-talk issues and offer a generally superior result for most applications, particularly those involving relatively smaller track pitch, than in the case of ROM pits being as wide as or slighter wider than the ROM grooves in which they reside. FIG. 23b illustrates a ROM pit 334 that is substantially narrower than the ROM groove 320 in which it resides, for comparison with the configuration shown in FIG. 25.

As is well known in the art, the CD-RW format is based on reflectivity detection from dual phase (i.e., either crystalline or amorphous) materials in which binary data values are stored, with binary "zero" representing one of the two phases and binary "one" representing the other. Accordingly, the depths of the ROM pits in CD-RW hybrid discs are quite small, certainly far less than 250 nanometers, perhaps even 90 nanometers or less. Furthermore, it is believed that proper application of future CD-R dye layers that are very thin may result in recorded pits in the finished CD-R hybrid disc that, when conventionally read from the second surface, provide adequate HF and PP response. For such thin dye layers the required ROM pit depth in the substrate would also need to be considerably less than 250 nanometers.

We have found that the preferred relationship between the depths of corresponding features, before and after dye coating is in the range of 30% to 80%, most preferably within the range of 50% to 70%. For example, $D_{RGD}$ is preferably 30% to 80% of $D_{RGroove}$; and $D_{ROMGD}$ is preferably 30% to 80% of $D_{ROMGroove}$ is preferably within the same range of 50% to 70%, with a range of 50% to 70% being most preferred.

However, we have found, and continue to believe, that the best tradeoff in the conflicting requirements of HF and PP detection occurs when $W_{ROMGroove} \geq W_{Pit}$, although the aforementioned recent research has shown that $W_{Pit}$ may equal or even somewhat exceed $W_{ROMGroove}$, as mentioned above. We have also observed that $D_{ROMGroove}$ must be made large enough to provide an adequate tracking signal and reliable ATIP recovery, without causing it to be too great to compromise reliable, high speed replication due to over-deep pits.

Because the parameters of each manufacturing system are so numerous and greatly differ individually from system to system, it is impossible to specify individual values for some of these parameters, beyond providing the sort of guidance offered above. Each system must be optimized to provide the highest possible Figure of Merit, and this is particularly true in the case of hybrid disc mastering and manufacture, as known and appreciated by all those who are experienced in this field.

The clear replicas may be tested for compliance with the above requirements, and the system preliminarily optimized to that point without continuing to the spin coating phase. If the above criteria are not met, appropriate adjustment may be made in one or more of the available parameters at the mastering phase or at any other step(s) in the entire upstream production chain that is/are suspected to have caused the unacceptable results. Usually, the mastering parameters are first adjusted, since this is merely a matter of altering the setting of one or a few adjustable inputs.

Such parameter tweaking is inherent in the feedback optimization technique universally employed in CD manufacturing, which comprises: (1) creating masters; (2) replicating them in a start-to-finish production line, preferably under one roof; (3) analyzing the replicas and noting the manner and extent to which they fail to conform to the applicable specifications or requirements; (4) re-adjusting the mastering parameters; (5) generating further replicas for analysis; and (6) repeating this process until replicas of the desired characteristics are consistently obtained.

Ultimately, the Orange Book specifications must be met in respect to the final hybrid discs and later-recorded hybrid discs, and the Red Book specifications incorporated into the Orange Book specifications must be met in respect to their respective ROM areas. This requires further optimization, along the lines suggested above, to meet these specifications, and to maximize Figure of Merit in order to ensure that they will continuously be met. Each and every production line variable may require tweaking to achieve the latter necessary result.

For example, one of the production variables commonly encountered is the relative ability of the replicating (i.e., molding) apparatus to apply consistent pressure from the center of the clear replica disc to its outer periphery. Radial decrease in pressure may result in clear replica hybrid discs whose ROM pits tend to become shallower toward the outer portion of the replicated disc. U.S. Pat. No. 5,608,712, discussed above, deals with this problem in a manner similar to application of the ramping function described above. This merely illustrates the fact that different production lines present different optimization challenges, and that there is no substitute for properly analyzing final hybrid discs and adjusting mastering and manufacturing parameters accordingly.

It should be noted that the improvements of the invention may be observed not only in the hybrid disc masters, but also in stampers replicated from such masters and in structures (the clear replica hybrid discs or perhaps other intermediary structures) replicated from such stampers, or directly from such masters. Since all such replicas, whether clear replica or final, will display improved features of the invention, all would fall within the inventive concept.

As suggested above, the invention is certainly not limited to hybrid CD manufacturing. It may also be applied, for example, to CD-RW hybrid disc or MO disc manufacturing.

The only basic difference between the CD-RW hybrid disc format and the CD-R (or DVD-R) hybrid disc formats lies in the selection of the recording layer(s) applied onto the clear replica hybrid disc. In the CD-RW case, the substance vacuum deposited onto the clear replica hybrid disc would be a thermally-induced phase-changing material, while the ROM marks could be data pits, just as in the CD (or DVD) hybrid disc case. In the MO case, the vacuum-deposited substance would be a conventional material whose magnetic orientation is selectively reversible by thermal means acting in concert with an external magnetic field. Such materials and their application and use are well known to those of ordinary skill in the relevant art, who would readily understand that the vertical dimensions of the features on the hybrid disc masters and the clear replicas would not need to be as great as those in the hybrid CD case in order to achieve proper phase depth in the final hybrid discs.

Likewise, the invention is not limited to the use of spinning discs. Its teachings may be applied equally to any replicatable structure with microscopically represented ROM data and a groove for later selective user recording of data on the final, replicated structure. In the case of a stationary structure, the master could be generated by a dual beam (or single transversely dithered beam) whose recording spot(s) would follow a raster scan on one or more planes of the structure, in a manner that one of ordinary skill in the art could readily implement.

Many alternations and modifications may be made by those having ordinary skill in the art without departing from the spirit and scope of the invention. Therefore, it must be understood that the illustrated and described embodiments have been set forth only for the purpose of example and that these should not be taken as limiting the invention as defined by the claims which follow.

The words used in this Specification to describe the invention and its various embodiments are to be understood not only in the sense of their commonly defined meanings, but also to include, by special definition in this Specification, structures, materials or acts beyond the scope of the commonly defined meanings. Thus if an element can be understood in the context of this Specification as including more than one meaning, then its use in a claim must be understood as being generic to all possible meanings supported by the Specification and by the word itself.

The definitions of the words or elements of the following claims, therefore, include not only the combination of elements which are literally set forth, but all equivalent structures, materials or acts for performing substantially the same function in substantially the same way to obtain substantially the same result.

Insubstantial departures from the claimed subject matter as viewed by a person with ordinary skill in the art, now known or later devised, are expressly contemplated as being equivalently within the scope of the claims, even though not performing exactly the same function in substantially the same way to obtain substantially the same result. Therefore, substitutions now or later known to one with ordinary skill in the art will be within the scope of the defined elements.

The claims are thus understood to include what is specifically illustrated and described above, what is conceptually equivalent, what can be obviously substituted and also what essentially incorporates the essential idea of the invention.

We claim:

1. A hybrid structure comprising:
   a. a first region storing selectively retrievable data in a data layer of substantially uniform composition containing a substantially planar first level,
      (1) a quantum of said data represented by a three-dimensional first feature in said first region, said first region containing a plurality of said first features successively along a portion of a first track in said first region, each first feature having a longitudinal first feature extent, a microscopic transverse first feature extent normal to said longitudinal first feature extent and co-planar therewith in a first feature plane at a first level and a microscopic vertical first feature extent normal to said first feature plane, at least a portion of said first feature vertically displaced from said first level, said first feature further characterized in that:
         (a) the outer shape of said first feature, defined by a transverse section thereof, displays no substantial slope discontinuity from the point at which said first feature begins its vertical displacement from an index level defined upon said structure, at one transverse edge of said first feature, until the point at which said vertical displacement from said index level ends at the opposite transverse edge of said first feature;
         (b) the extent of said first feature in said vertical direction, in respect to said index level, is not more than approximately 0.25 micron, the extent of said first feature in said transverse direction is not more than approximately one micron and the extent of said first feature in said principal direction is at least twice as great as the extent of said first feature in said transverse direction; and
         (c) the ratio of the maximum displacement of said first feature from said index level in a first vertical direction to said displacement in the opposite vertical direction excludes values within the range extending from approximately 0.2 to approximately 5.0,
      (2) a successive pair of first features in said region longitudinally separated by a three-dimensional data-representing data segment, said data segment comprising at least part of a three-dimensional first track feature longitudinally extending along said first track, the longitudinal axis of said data segment substantially coinciding with the longitudinal axis of said successive pair of first features, said data segment having a longitudinal data segment extent along said first track, a transverse data segment extent in a direction normal to said longitudinal data segment extent and co-planar therewith in a data segment plane, and a vertical data segment extent in a vertical direction normal to said data segment plane, said vertical segment extent, measured from said index level, less than 170 nanometers, and said transverse data segment extent microscopic; and
   b. a second region comprising a second track portion, at least some of said second track portion displaced from said first track portion in the direction of said transverse data segment extent, a length of said second track portion having a longitudinal second track portion extent, a microscopic transverse second track portion extent normal to said longitudinal second track portion extent and co-planar therewith in a second track portion plane, and a microscopic vertical second track portion extent normal to said second track portion plane.

2. An intermediary hybrid structure displaying three-dimensional features corresponding to thee-dimensional features of the structure recited in claim 1.

3. A final hybrid structure displaying thee-dimensional features corresponding to three-dimensional features of the structure recited in claim 2.

4. A hybrid structure comprising:
   a. a first region storing selectively retrievable data in a data layer of substantially uniform composition containing a substantially planar first level,
      (1) a quantum of said data represented by a three-dimensional first feature in said first region, said first region containing a plurality of said first features successively along a portion of a first track in said first region, each first feature having a longitudinal first feature extent, a microscopic transverse first feature extent normal to said longitudinal first feature extent and co-planar therewith in a first feature plane at a first level and a microscopic vertical first feature extent normal to said first feature plane, at least a portion of said first feature vertically displaced from said first level, said first feature further characterized in that:
         (a) the outer shape of said first feature, defined by a transverse section thereof, displays no substantial slope discontinuity from the point at which said first feature begins its vertical displacement from an index level defined upon said structure, at one transverse edge of said first feature, until the point at which said vertical displacement from said index level ends at the opposite transverse edge of said first feature; and
         (b) the ratio of the maximum displacement of said first feature from said index level in a first vertical direction to said displacement in the opposite vertical direction excludes a substantially zero value, a substantially infinite value, and values within the range extending from approximately 0.2 to approximately 5.0.;
      (2) a successive pair of first features in said region longitudinally separated by an indented three-dimensional data-representing data segment comprising at least part of an indented three-dimensional first track feature longitudinally extending along said first track, the longitudinal axis of said data segment substantially coinciding with the longitudinal axis of said successive pair of first features, said data segment having a longitudinal data segment extent along said first track, a transverse data segment extent in a direction normal to said longitudinal data segment extent and co-planar therewith in a data segment plane, and a vertical data segment extent in a vertical direction normal to said data segment plane, said transverse data segment extent and said vertical data segment extent each microscopic, the width of each said first feature in said pair, measured at one-half of the vertical first feature extent is not more than approximately 110% of the width of said data segment, measured at one-half of the vertical data segment extent; and
   b. a second region comprising a second track portion, at least some of said second track portion displaced from said first track portion in the direction of said transverse data segment extent, a length of said second track portion having a longitudinal second track portion extent, a microscopic transverse second track portion extent normal to said longitudinal second track portion extent and co-planar therewith in a second track portion plane, and a microscopic vertical second track portion extent normal to said second track portion plane.

* * * * *